US011485383B2

(12) United States Patent
Weissert et al.

(10) Patent No.: US 11,485,383 B2
(45) Date of Patent: Nov. 1, 2022

(54) SYSTEM AND METHOD FOR DETECTING AND MITIGATING AN UNSAFE CONDITION IN A VEHICLE

(71) Applicant: Robert Bosch GmbH, Stuttgart (DE)

(72) Inventors: Stefan Weissert, Detroit, MI (US); Davis Barch, San Mateo, CA (US); Vimalanandan Selva Vinayagam, Pittsburgh, PA (US); Govind Rathore, Pittsburgh, PA (US); Pranavkumar Masariya, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 16/705,961

(22) Filed: Dec. 6, 2019

(65) Prior Publication Data
US 2021/0171039 A1  Jun. 10, 2021

(51) Int. Cl.
*B60W 60/00* (2020.01)
*B60W 30/18* (2012.01)
*B60W 50/14* (2020.01)
*G06V 20/59* (2022.01)
*G06V 40/10* (2022.01)

(52) U.S. Cl.
CPC .. *B60W 60/0016* (2020.02); *B60W 30/18109* (2013.01); *B60W 50/14* (2013.01); *G06V 20/593* (2022.01); *G06V 40/103* (2022.01); *B60W 2050/143* (2013.01); *B60W 2420/42* (2013.01); *B60W 2540/01* (2020.02); *B60W 2540/223* (2020.02); *B60W 2540/227* (2020.02); *G06V 40/10* (2022.01)

(58) Field of Classification Search
CPC ....... B60W 60/0016; B60W 30/18109; B60W 50/14; B60W 2050/143; B60W 2420/42; B60W 2540/227; B60W 2540/01; B60W 2540/223; G06V 20/593; G06V 40/103; G06V 4/10
See application file for complete search history.

(56) References Cited

U.S. PATENT DOCUMENTS 5,071,160 A   12/1991  White et al.
5,782,485 A *  7/1998  Takeda ................ B60R 21/0154
                                              701/45

(Continued)

FOREIGN PATENT DOCUMENTS

DE   19741393 A1 *  3/1998  ......... G06K 9/00362
DE   19814691 A1 *  3/1999  ......... G06K 9/00362
WO   WO-2020226211 A1 * 11/2020  ............. B60N 2/002

*Primary Examiner* — Dale W Hilgendorf
(74) *Attorney, Agent, or Firm* — Maginot, Moore & Beck LLP

(57) ABSTRACT

A system for detecting and mitigating an unsafe condition in a vehicle includes an image sensor configured to generate and output image data of one or more seats in a cabin of the vehicle and a processing system operably connected to the image sensor and including at least one processor. The processing system is configured to receive the image data from the image sensor, process the image data to determine a location of at least one passenger in the cabin, detect that the at least one passenger is located outside of the one or more seats based on the determined location of the at least one passenger in the cabin, and operate at least one component of the vehicle in a predefined manner in response to detecting that the at least one passenger is located outside of the one or more seats.

12 Claims, 10 Drawing Sheets

(56) References Cited

U.S. PATENT DOCUMENTS

| | | | |
|---|---|---|---|
| 6,272,411 B1* | 8/2001 | Corrado | B60R 21/0154 |
| | | | 701/45 |
| 7,920,722 B2 | 4/2011 | Mita et al. | |
| 10,035,491 B2 | 7/2018 | Harda et al. | |
| 10,129,643 B2 | 11/2018 | Lopez et al. | |
| 10,246,015 B2 | 4/2019 | Reymann et al. | |
| 10,303,961 B1 | 5/2019 | Stoffel et al. | |
| 10,311,693 B1 | 6/2019 | Lee et al. | |
| 10,311,704 B1 | 6/2019 | Xu et al. | |
| 10,558,874 B1* | 2/2020 | Chan | G06K 9/00845 |
| 2007/0290554 A1 | 12/2007 | Teshima et al. | |
| 2008/0142713 A1 | 6/2008 | Breed et al. | |
| 2016/0280067 A1* | 9/2016 | Cuddihy | G08B 21/22 |
| 2017/0200082 A1 | 7/2017 | Bohm | |
| 2018/0208209 A1* | 7/2018 | Al-Dahle | B60W 10/22 |
| 2019/0102635 A1* | 4/2019 | Yamamoto | G06V 20/52 |
| 2019/0147262 A1* | 5/2019 | Kuehnle | G07C 5/008 |
| | | | 340/439 |
| 2019/0147263 A1* | 5/2019 | Kuehnle | G07C 5/0808 |
| | | | 340/439 |
| 2019/0171871 A1* | 6/2019 | Zhang | G06T 7/75 |
| 2019/0184853 A1 | 6/2019 | Thomas et al. | |
| 2019/0265703 A1* | 8/2019 | Hicok | G05D 1/0242 |
| 2019/0299895 A1* | 10/2019 | Herbert | G06K 9/00369 |
| 2019/0303729 A1* | 10/2019 | Gramenos | G06K 9/00832 |
| 2020/0012848 A1* | 1/2020 | Goto | G06T 7/246 |
| 2020/0098128 A1* | 3/2020 | Fujii | G06T 7/60 |
| 2020/0189610 A1* | 6/2020 | Sakai | F02D 41/107 |
| 2021/0008958 A1* | 1/2021 | Porta | B60Q 9/00 |
| 2021/0078609 A1* | 3/2021 | Barth | G06K 9/00845 |
| 2021/0081687 A1* | 3/2021 | Yamamoto | G06K 9/00838 |
| 2021/0114541 A1* | 4/2021 | Hosokawa | B60W 40/08 |
| 2021/0179117 A1* | 6/2021 | Glazman | H04S 7/303 |
| 2021/0237778 A1* | 8/2021 | Ku | B60W 60/0016 |
| 2021/0354701 A1* | 11/2021 | Lee | B60W 60/001 |

* cited by examiner

SYSTEM AND METHOD FOR DETECTING AND MITIGATING AN UNSAFE CONDITION IN A VEHICLE

CROSS REFERENCE TO RELATED APPLICATION

This application is related to U.S. application Ser. No. 16/705,978, entitled "System and Method for Detecting Abnormal Settling of Passengers in a Vehicle," filed on even date herewith, the contents of which are incorporated herein by reference in their entirety.

FIELD

This disclosure relates generally to vehicle cabin systems, and, more particularly, to systems for detecting an unsafe condition caused by a passenger being out of his or her respective seat in a vehicle.

BACKGROUND

As the technologies move towards autonomous driving, there will be no human driver in the car in the future. However, the lack of a human driver presents a new set of challenges. Particularly, without a human driver, the car itself may need to take on the task of understanding the state of the car interior.

More specifically, an unsafe condition may arise when a passenger is moving within the cabin and is not in the seat. In conventional vehicles, a driver can recognize the unsafe situation and take the necessary action to mitigate the unsafe condition. In an autonomous vehicle, however, there is no driver to recognize and remedy the unsafe situation. As such, improvements to systems and methods for identifying and remedying unsafe conditions when a passenger is out of his or her seat would be beneficial.

SUMMARY

In one embodiment, a system detects and mitigates an unsafe condition in a vehicle. The system includes an image sensor configured to generate and output image data of one or more seats in a cabin of the vehicle and a processing system operably connected to the image sensor and including at least one processor. The processing system is configured to receive the image data from the image sensor, process the image data to determine a location of at least one passenger in the cabin, detect that the at least one passenger is located outside of the one or more seats based on the determined location of the at least one passenger in the cabin, and operate at least one component of the vehicle to in a predefined manner in response to detecting that the at least one passenger is located outside of the one or more seats.

In an embodiment, the processing system is further configured to, in the processing of the image data, estimate a pose of the at least one passenger to determine a respective passenger location point for each passenger of the at least one passenger.

In another embodiment, the processing system is further configured to, in the estimation of the pose, estimate hip locations of each passenger, and determine the respective passenger location point as a midpoint between the estimated hip locations.

The processing system of the system may, in another embodiment, be further configured to, in the estimation of the pose, estimate shoulder locations of each passenger, and determine the respective passenger location point as a midpoint between the estimated shoulder locations.

The processing system may be further configured to detect that the at least one passenger is located outside of the one or more seats in response to at least one of the respective passenger location points being outside of a first seat boundary of the at least one seat for a predetermined first time period.

In another embodiment, the at least one component includes a drive system of the vehicle, and the operating of the at least one component of the vehicle to in the predefined manner further comprises operating the drive system of the vehicle to slow or stop the vehicle.

In yet another embodiment, the at least one component includes a speaker configured to project audio into the cabin of the vehicle, and the operating of the at least one component of the vehicle in the predefined manner further comprises operating the speaker to generate an audible alert.

In some embodiments, the at least one component includes at least one of a display and a light arranged in or adjacent to the cabin of the vehicle, and the operating of the at least one component of the vehicle to in a predefined manner further comprises operating the at least one of the display and the light to generate a visual alert.

In another embodiment, a method of detecting and mitigating an unsafe condition in a vehicle comprises receiving, with a processing system, image data of one or more seats in a cabin of the vehicle from an image sensor and processing, with the processing system, the image data to determine a location of at least one passenger in the cabin. The method further includes detecting, with the processing system, that the at least one passenger is located outside of the one or more seats based on the determined location of the at least one passenger in the cabin and operating at least one component of the vehicle with the processing system in a predefined manner in response to detecting that the at least one passenger is located outside of the one or more seats.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "comprising," "including," "having," and the like, as used with respect to embodiments of the disclosure, are synonymous. As used herein, the term "approximately" refers to values that are within ±10% of the reference value.

Figure 1:
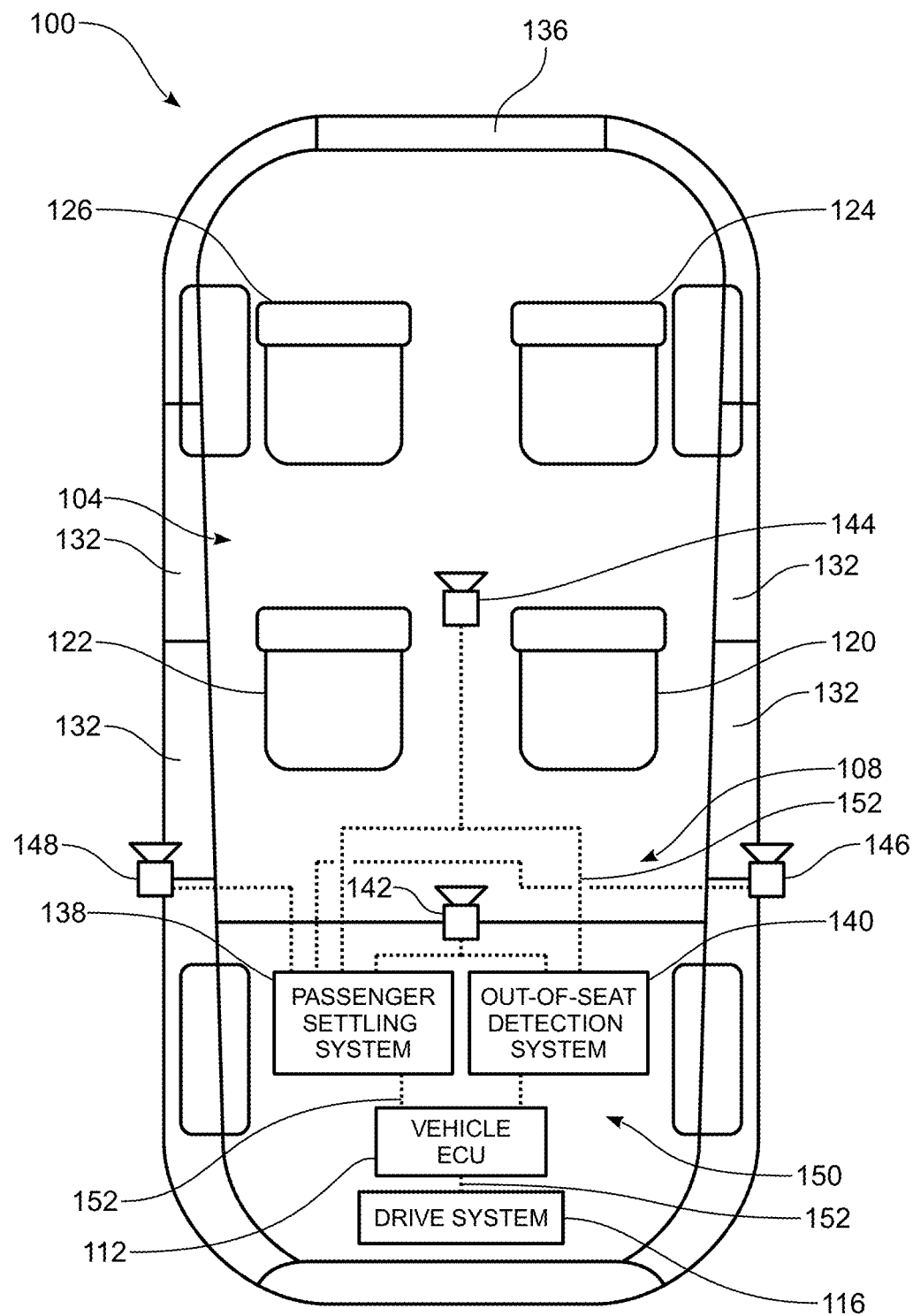
FIG. 1 is a schematic top view of a vehicle with a cabin monitoring system having a passenger settling monitoring system and an out-of-seat detection system.

FIG. 1 shows a simplified block diagram of a vehicle 100 having a cabin 104, a cabin monitoring system 108, a vehicle electronic control unit ("ECU") 112, and a drive system 116. As discussed in detail below, the cabin monitoring system 108 is configured to monitor the positions of passengers in the vehicle 100 and determine whether the passenger is properly settled into the vehicle and whether the passenger is out of his or her respective seat. The cabin monitoring system 108 improves upon conventional vehicle monitoring systems by advantageously using key points of the passengers of the vehicle to determine whether the passengers are in one of the seats in the vehicle. Additionally, the cabin monitoring system 108 enables generation of a signal corresponding to a passenger failing to properly settle into the vehicle in a predetermined time period based on the locations of the passengers, enabling the vehicle ECU 112 to advantageously take actions to mitigate the problems caused by the passengers failing to settle into the seats of the vehicle. Particularly, the vehicle ECU 112 can mitigate the problems caused by the passengers failing to settle into the seats of the vehicle by, for example, preventing the vehicle from moving, operating speakers, lights, or a display screen to warn the passengers that they are not properly settled into the seats, instruct the passengers how to properly sit in the vehicle, inform the passengers that the vehicle cannot move until the passengers are properly seated, and/or communicate with a remote server to allow human intervention.

Additionally, the cabin monitoring system 108 is an improvement to conventional vehicle monitoring systems by advantageously providing an accurate way of determining whether passengers have left their respective seats without repeated alerts or false positive alerts. In addition, the cabin monitoring system 108 advantageously provides for generating a signal corresponding to a passenger out of his or her respective seat and communicating the signal to the vehicle ECU 112 so that the vehicle ECU 112 can take action to mitigate an unsafe condition caused by the passenger being out of his or her respective seat. As used herein, the phrase "unsafe condition" refers to a situation in which a passenger is located in a position in the vehicle, for example outside of the vehicle seats, at which the passenger is at an increased risk for injury in the event of a sudden maneuver or accident by the vehicle. The unsafe condition can be mitigated by the vehicle ECU 112 by, for example, operating lights, speakers, and/or a display to instruct the passenger to return to his or her seat and by operating the drive system 116 to slow the vehicle 100 and steer to a safe location to stop the vehicle 100 to reduce the likelihood of a sudden maneuver or accident that could cause an injury when the passenger is outside of his or her seat. Accordingly, the cabin monitoring system 108 improves conventional vehicle monitoring systems by increasing the safety of the vehicle and reducing the likelihood of injuries caused to passengers in the vehicle 100.

The vehicle 100 depicted in FIG. 1 is an automobile, and the cabin 104 includes four seats 120, 122, 124, 126 in which passengers can be seated. The reader should appreciate that the cabin 104 may include more or less seats depending on the configuration and type of the vehicle 100. The drive system 116 of the vehicle 100 includes a drive motor, for example an internal combustion engine and/or one or more electric motors, that drives the wheels of the vehicle 100, and the steering and braking components that enable the vehicle 100 to be moved in a controlled manner.

In other embodiments, the vehicle 100 may include any number of types of vessels having one or more cabins 104 for moving people or cargo, such as trains, buses, subways, aircraft, helicopters, passenger drones, submarines, elevators, and passenger moving pods. The cabin 104 (which may also be referred to herein as a compartment) is a typically closed room for accommodating passengers or cargo. Although the vehicle 100 is illustrated as having a single cabin 104, the reader should appreciate that the vehicle 100 may include any number of individual and separate cabins 104 (e.g., multiple compartments or rooms inside a train car).

In this exemplary embodiment, the vehicle 100 is a shared autonomous vehicle that is configured to drive autonomously to the location of a passenger, then upon the passenger entering the vehicle 100, autonomously transport the passenger to a desired location using the public roadway network. The passenger may engage the services of the vehicle 100 using a smartphone or smart device application (i.e. an "app"), for example. The passenger is also referred to herein as an occupant, a user, an operator, or a person. In other embodiments, the vehicle 100 is any type of passenger vehicle, as described above, and, in some embodiments, may be occupant controlled or remotely controlled.

The vehicle 100 also includes a plurality of doors 132 enabling passengers to access the cabin 104 and the seats 120-126. In addition, the vehicle 100 may include a rear hatch 136 enabling a user to access a cargo storage area of the vehicle, for example a trunk or storage space behind the rear seats.

The cabin monitoring system 108 is configured to estimate the positions of passengers in the cabin 104 and determine whether the passengers are in their respective seats 120-126. The cabin monitoring system 108 includes a passenger settling monitoring system 138 and an out-of-seat detection system 140, each of which is communicatively coupled to one or more image sensors 142, 144, 146, 148. The vehicle ECU 112, the passenger settling monitoring system 138, and the out-of-seat detection system 140 may be jointly referred herein to as a processing system 150 of the vehicle 100 and may, in some embodiments, be integrated into a single control unit. Particularly, the passenger settling monitoring system 138, the out-of-seat detection system 140, and/or the vehicle ECU 112 may be integrated into the computer of the vehicle responsible for autonomous navigation of the vehicle 100 and operation of other components in the vehicle 100. In another embodiment, the processing system may be partially or wholly in the "cloud." For example, the vehicle ECU 112 may be configured to transmit data to remote memory via the Internet (e.g. in the "cloud"), and the processes and functions of the vehicle ECU 112, the passenger settling monitoring system 138, and/or the out-of-seat detection system 140 described herein may be executed by one or more processors that are located remotely from the vehicle (e.g. in the "cloud").

The image sensors 142, 144 in the cabin 104 of the vehicle are each configured to generate an image of a portion of the cabin 104, while one or more image sensors 146, 148 may be arranged so as to generate an image of a portion of the exterior of the vehicle 100. The image sensors 142-148 may be video or still image cameras, each of which has, for example, a charge-coupled device (CCD) or an active-pixel sensor for generating digital image data. In other embodiments, the image sensors 142-148 may include thermal or infrared sensors, a radar imaging system, a LIDAR imaging system, or another suitable imaging system.

In the illustrated embodiment, the cabin monitoring system 108 includes two image sensors 142, 144 in the cabin 104. The front image sensor 142 generates digital image data of the front of the cabin, including the front seats 120, 122, and the rear image sensor 144 generates digital image data of the rear of the cabin 104, including the rear seats 124, 126. In other embodiments, the cabin monitoring system 108 may include a single image sensor that captures images of the entire cabin 104, including all of the seats 120-126, a separate image sensor directed at each of the seats 120-126, or any desired configuration of image sensors to generate digital images of each seat in the vehicle.

In one embodiment, the image sensors 142, 144 are arranged in or on the roof of the vehicle 100 and directed downwardly into the cabin 104 toward the respective seat or seats 120-126 for imaging. In other embodiments, the image sensors may be arranged in the seats or in the dash of the vehicle 100. For example, in one particular embodiment, the image sensors for imaging the front seats 120, 122 are arranged in the dash of the vehicle 100, while the image sensors for imaging the rear seats 124, 126 are arranged in the front seat 120, 122 that is directly in front of the respective rear seat 124, 126.

The one or more external image sensors 146, 148 are configured to generate images of the area immediately surrounding the vehicle 100. For example, in the illustrated embodiment, the external image sensors 146, 148 may be mounted on or in place of rear view mirrors of the vehicle and directed toward the exterior of the doors 132.

Figure 2:
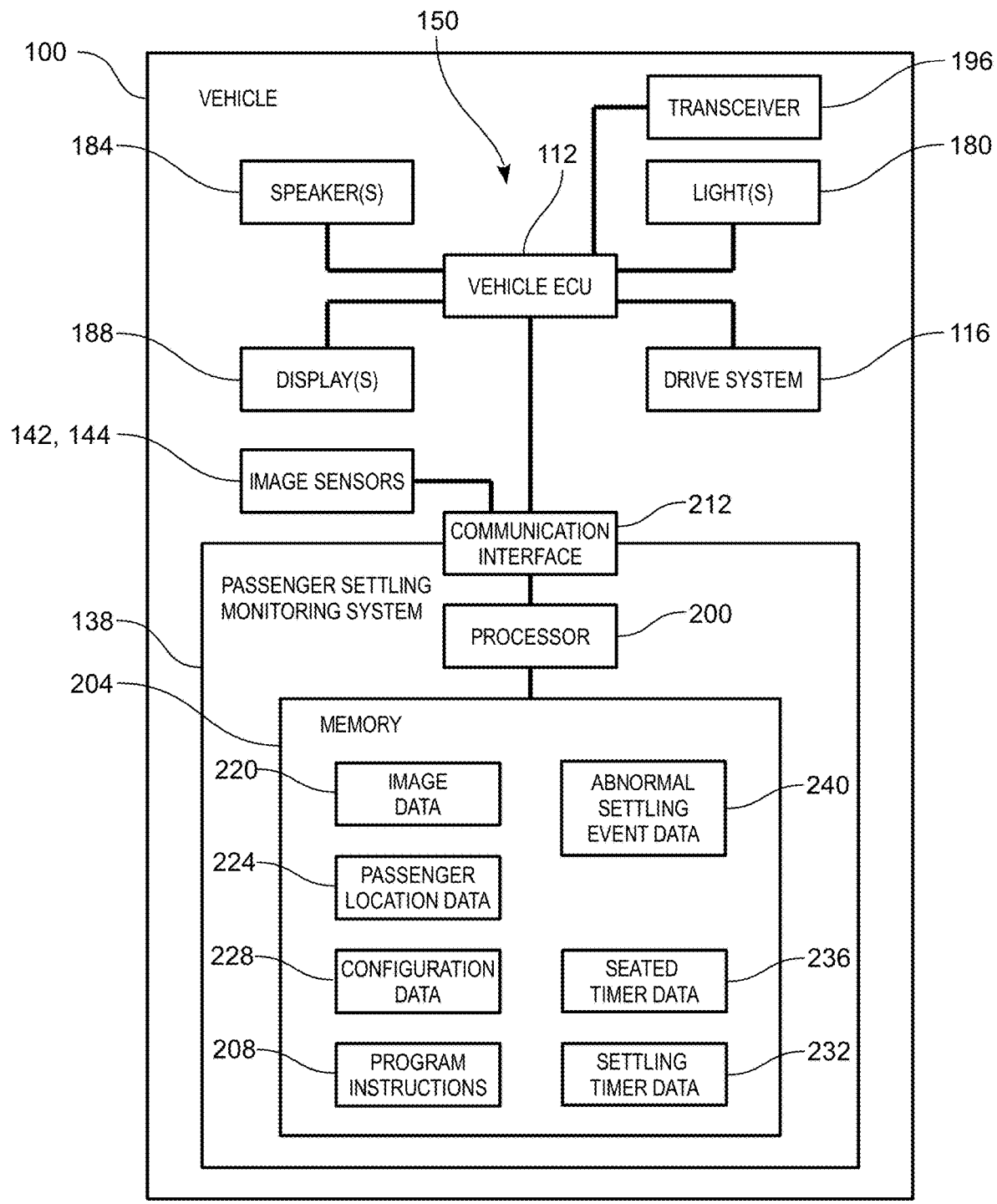
FIG. 2 is a schematic view of components of the vehicle and the passenger settling monitoring system of FIG. 1.
Figure 5:
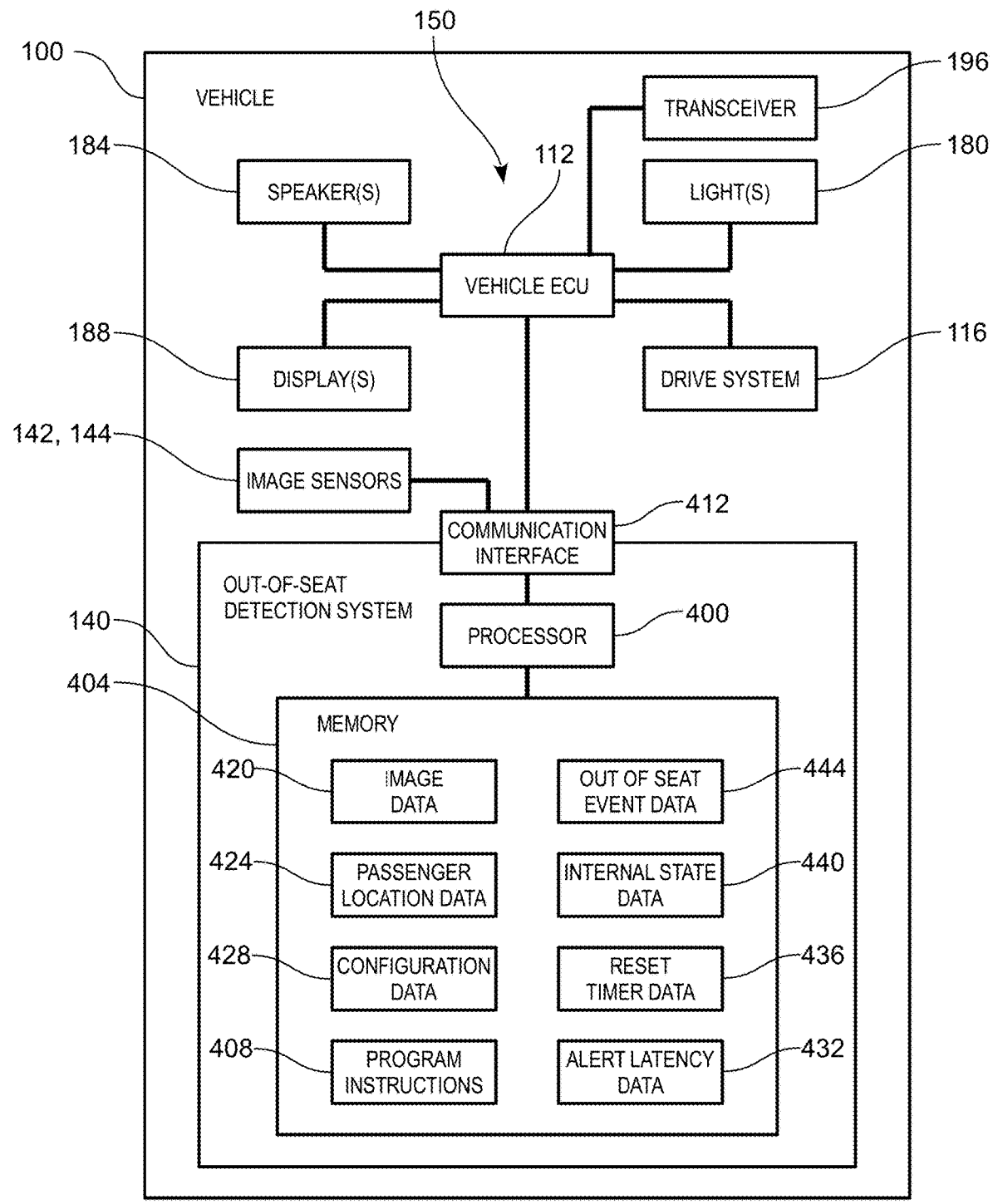
FIG. 5 is a schematic view of components of the vehicle and the passenger out-of-seat detection system of FIG. 1.

The vehicle ECU 112 is communicatively coupled to the out-of-seat detection system 140 and the drive system 116 via communication buses 152. The vehicle ECU 112 may also be connected to various additional components in the vehicle 100. For example, as illustrated in FIGS. 2 and 5, the vehicle ECU 112 may be communicatively coupled to one or more lights 180, one or more speakers 184, and/or one or more display screens 188 located in or configured to project light or sound into the cabin 104.

In addition, the vehicle ECU 112 may be communicatively coupled to a transceiver 196, which is also referred to as a wireless transmitter and receiver, and is configured to wirelessly transmit data from the vehicle ECU 112 to another electronic device (not shown) and to wirelessly receive data from another electronic device via the Internet, for example. Thus, the transceiver 196 operably connects the vehicle 100 to the Internet and to other electronic devices. In other embodiments, the transceiver 196 sends and receives data using a cellular network, a wireless local area network ("Wi-Fi"), a personal area network, and/or any other wireless network. Accordingly, the transceiver 196 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The vehicle ECU 112 may, for example, include one or more general or specialized programmable processors and/or controllers. It will be recognized by those of ordinary skill in the art that a "controller" or "processor" includes any hardware system, hardware mechanism or hardware component that processes data, signals, or other information. The at least one processor and/or controller of the vehicle ECU 112 is configured to execute program instructions stored on the associated memory thereof to manipulate data or to operate one or more components in the vehicle 100, for example the drive system 116, lights 180, speakers 184, displays 188, and transceiver 196 to perform the recited task or function.

Passenger Settling Monitoring System

With reference now to FIG. 2, the passenger settling monitoring system 138 of the cabin monitoring system 108 is configured to determine whether a passenger has settled into his or her respective seat when loading into the vehicle 100 based on received sensor signals, generate a signal representative of an abnormal loading event if the passenger is not settling properly into the vehicle, and communicate the signal to the vehicle ECU 112. The passenger settling monitoring system 138 is communicatively coupled to the image sensors 142, 144 via communication buses 152 and is configured to receive sensor signals, which may be analog or digital signals, from each of the image sensors 142, 144.

The passenger settling monitoring system 138 comprises at least one processor and/or controller, referred to below simply as the processor 200, operably connected to an associated memory 204. The processor 200 is configured to execute program instructions 208 stored on the memory 204 to manipulate data (e.g. data 220-240) or to operate one or more components in the passenger settling monitoring system 138 or the vehicle 100 to perform the recited task or function.

The memory 204 is an electronic storage device that is configured to store data and program instructions, including at least image data 220, passenger location data 224, configuration data 228, settled timer data 232, seated timer data 236, abnormal settling event data 240, and the program instructions 208 for operating the out-of-seat detection system 140. The memory 204 may include non-transitory computer-readable storage media and/or communication media, such as both volatile and nonvolatile, both write-capable and read-only, both removable and non-removable media implemented in any media or technology, including CD-ROM, DVD, optical disk storage, magnetic cassettes, magnetic tape, magnetic disk storage, or other known storage media technology.

The image data 220 is electronic data representative of the image or images captured by the image sensors 142, 144 and, in some embodiments, the exterior image sensors 146, 148. The passenger location data 224, as discussed in detail below, represents one or more points corresponding to a position of the passenger and/or relevant body parts of the passenger. The points may be stored as, for example, x-y coordinates corresponding to pixel locations in the associated image.

The configuration data 228 includes the boundaries of the seats which may, in one embodiment, also be x-y coordinates corresponding to pixel locations in the associated image. The configuration data 228 may include, for example, a boundary for hip regions and/or shoulder regions for each of the seats 120-126. The boundaries may be rectangular, trapezoidal, circular, triangular, another polygon, a combination of the above shapes, or any other suitable shape. In some embodiments, the seat boundaries may be irregularly shaped so as to follow a desired contour of the seat region representative of safe locations for the passenger. In addition, the configuration data 228 includes predetermined default values for the settling timer and the seated timer. The configuration data 228 may be pre-programmed into the memory 204, or it may be user-configurable or remotely configurable depending on the desired use and configuration of the vehicle 100.

In some embodiments, one or both of the default values for the settling timer and the seated timer may be dependent on the particular passenger or user. For example, in one embodiment, the default value for the settling timer may be a longer time or larger frame count for a passenger that is, for example, elderly or has a disability that causes the passenger to load the vehicle at a slower rate than a typical passenger. In another embodiment, the default value for the settling timer may be based on data collected from previous settling times for that particular user or passenger such that the abnormal settling event is only generated if the settling time is abnormally long for the specific passenger. The passenger-specific default values may be transmitted to the vehicle from a remote server via known methods by, for example, the transceiver 196.

The settling timer data 232 includes the settling timer variable, which corresponds to a decrementing counter or timer of the number of frames or length of time that must elapse with the passengers not properly in their respective seats before an abnormal settling event is generated. The seated timer data 236 includes the seated timer variable, which corresponds to a decrementing timer or counter of the consecutive number of frames or length of time that passengers must be in their respective seats before the passengers are determined to have completed loading the vehicle. The abnormal settling event data 240 is the alert data that is output by the passenger settling monitoring system 138 when a passenger has been detected as settling in an abnormal manner, enabling the vehicle ECU 112 to implement actions to mitigate an abnormal loading event.

In some embodiments, the passenger settling monitoring system 138 further comprises a communication interface assembly 212 having one or more interfaces configured to couple the passenger settling monitoring system 138 with the image sensors 142-148 and the vehicle ECU 112. The communication interface assembly 212 is configured to enable sensor data, control signals, software, or other information to be transferred between the passenger settling monitoring system 138 and the image sensors 142-148 or the vehicle ECU 112 in the form of signals which may be, for example, electronic, electromagnetic, optical, or other signals capable of being received or transmitted by the communication interface assembly 212. In some embodiments, the communication interface assembly 212 may include physical terminals for connecting to wired media such as a wired network or direct-wired communication (e.g., the communication buses 152). In further embodiments, the communication interface assembly 212 may include one or more modems, bus controllers, or the like configured to enable communications with the image sensors 142-148 and the vehicle ECU 112. In some embodiments, the communication interface assembly 212 may include one or more wireless transceivers configured to enable wireless communication such as acoustic, RF, infrared (IR), Wi-Fi, Bluetooth®, and other wireless communication methods.

Abnormal Passenger Settling Detection Process

Figure 3:
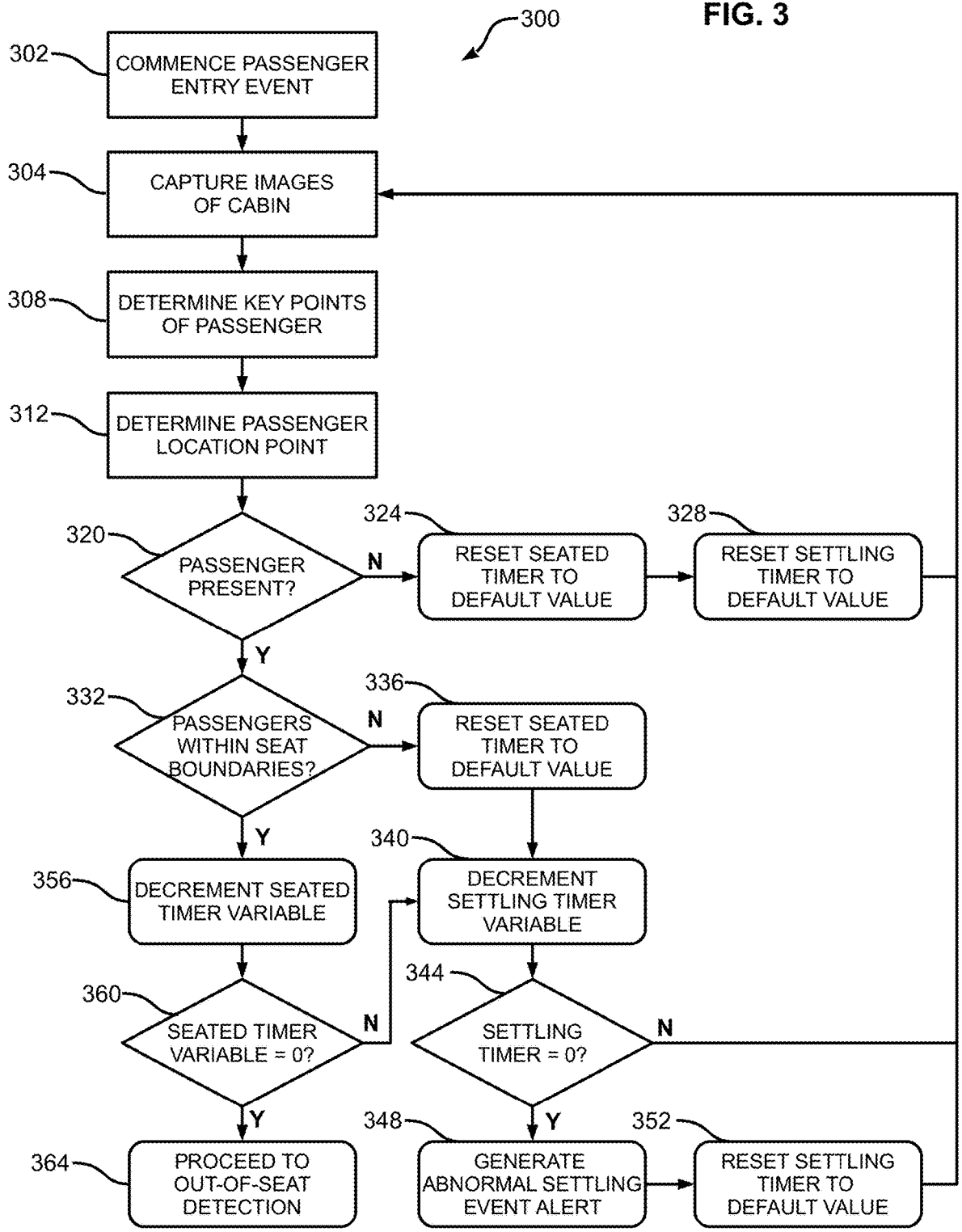
FIG. 3 is a flow diagram of a method of operating the passenger settling monitoring system of FIG. 1 to generate an alert if a passenger is settling into the vehicle in an abnormal manner.

In operation, the passenger settling monitoring system 138 is configured to implement a method 300 illustrated by the flowchart of FIG. 3 to determine whether the passengers have settled into seats 120-126 and completed loading of the vehicle, and to generate an alert for an abnormal settling event if the passengers do not settle into the vehicle properly within a predetermined time period. In the description of the method 300, statements that a method, process, module, processor, system, or the like is performing some task or function refers to a controller or processor (e.g., the processor 200) executing programmed instructions (e.g., the program instructions 208) stored in non-transitory computer readable storage media (e.g., the memory 204) operatively connected to the controller or processor to manipulate data or to operate one or more components in the cabin monitoring system 108 and/or the vehicle 100 to perform the task or function. Additionally, the steps of the methods may be performed in any feasible chronological order, regardless of the order shown in the figures or the order in which the steps are described. It will be appreciated that, in some embodiments, the operations of the processor 200 described herein may be performed by other components of the processing system 150 and/or of the cabin monitoring system 108, such as the vehicle ECU 112 or integrated image processors of the sensors 142, 144, etc., or the operations may be performed by one or more processors that are remote from the vehicle (e.g. in the "cloud").

The method 300 of FIG. 3 begins with the processor 200 initiating a passenger entry event (block 302). The processor 200 may, in some embodiments, initiate the passenger entry event in response to a command received from the vehicle ECU 112 indicating that the vehicle 100 has reached a passenger pick-up location. In another embodiment, the vehicle ECU 112 or the processor 200 communicates with the exterior image sensors 146, 148 and/or door sensors (not shown) that sense an open or closed state of the doors, and the processor 200 initiates the passenger loading event in response to detecting that passengers are loading into the vehicle.

Once the passenger loading event has initiated in block 302, the method 300 continues with the interior image sensors 142, 144 capturing images of interior of the cabin 104, in particular of the seats 120-126 (block 304). Additionally, in some embodiments, the exterior image sensors 146, 148 are also operated in block 304 to capture images of the exterior of the vehicle.

Figure 8A:
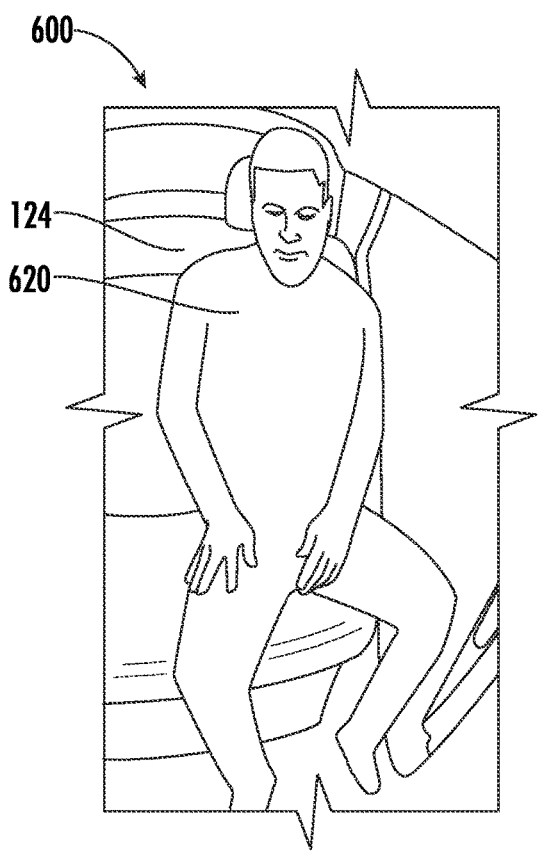
FIG. 8a is an image of a passenger in a seat of the vehicle of FIG. 1.

The images may be one or more RGB images of the cabin 104, including the seats 120-126, or the images may be infrared images, three-dimensional radar or LIDAR images, or other desired images. The processor 200 of the out-of-seat detection system 140 receives the images from the image sensors 142, 144 via, for example, the communication interface assembly 212 and the communication bus 152. The images may, in some embodiments, be resized by either the image sensors 142, 144 or the processor 200, and stored in the image data 220 of the memory 204. Example images 600, 610 are depicted in FIGS. 8*a* and 9*a*, of which FIG. 8*a* depicts an example image 600 captured by the rear image sensor 144 illustrating a passenger 620 sitting in the seat 124, while FIG. 9*a* illustrates an example image 610 captured by the rear image sensor 144 illustrating two passengers 624, 626 sitting in the rear seats 124, 126.

Referring back to FIG. 3, the process 300 continues by processing the image data to determine key points of the passengers in the cabin 104 and, in some embodiments, persons located outside the vehicle and detected in the images captured by the external image sensors 146-148 (block 308). Particularly, the processor 200 is configured to determine a plurality of key points in the image data to estimate a pose of the passenger. As used herein, a "pose" of the passenger refers the relative and/or absolute position and/or orientation of one or more joints, limbs, or other body parts of the passenger. For example, in at least one embodiment, the pose of the passenger comprises a plurality of points corresponding to positions of particular joints, in particular hip and/or shoulder joints, of the passenger. More particularly, the processor 200 processes the image data to approximate the positions of certain joints of the passenger based on the image data 220, and returns the positions as x-y coordinates in the image. The processor 200 may be configured to execute any suitable pose estimation technique in a manner generally known in the art.

Figure 8B:
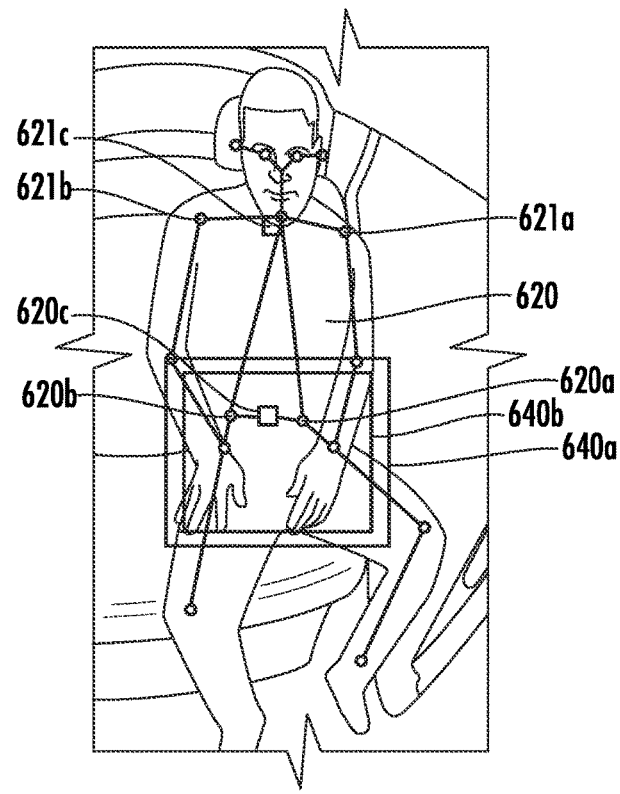
FIG. 8b is an image of the passenger of FIG. 8a illustrating the passenger location points and the seat boundaries.
Figure 9A:
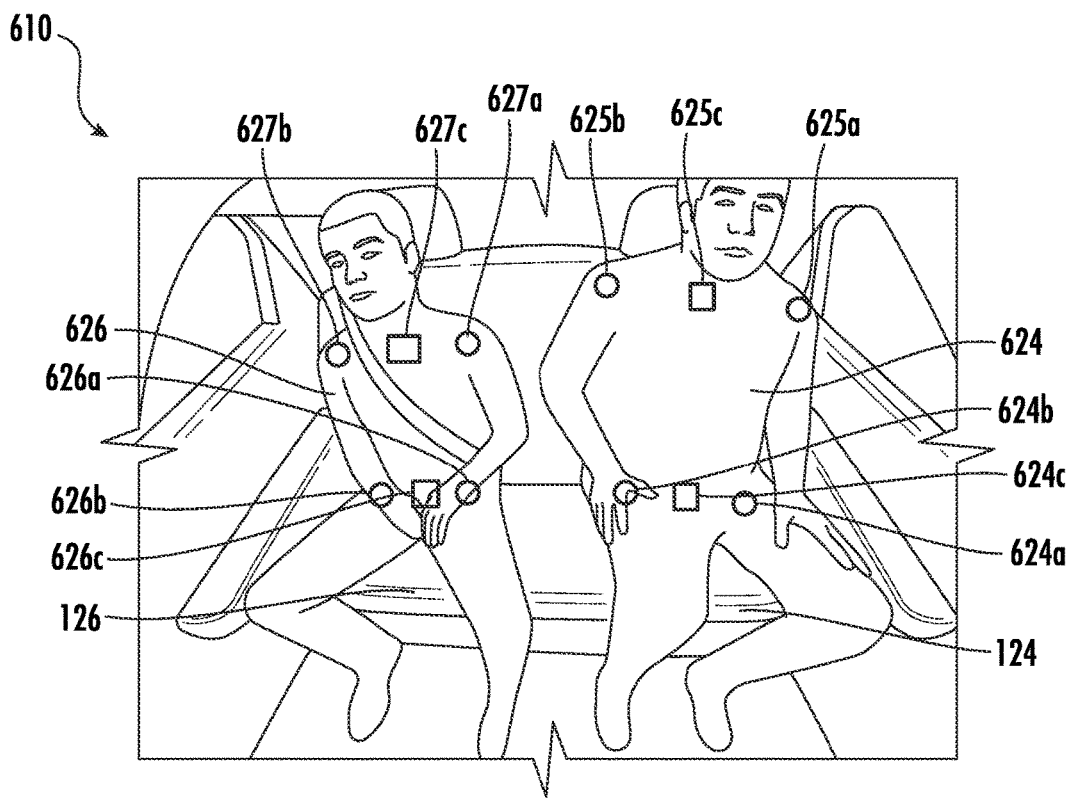
FIG. 9a is an image of two passengers in respective seats of the vehicle of FIG. 1 illustrating the passengers' shoulder locations, hip locations, and passenger location points.

The key points are, in one embodiment, the location of the left and right hips of the passenger (e.g. hip locations 620*a* and 620*b* of the passenger 620 in FIG. 8*b* and hip locations 624*a-b* and 626*a-b* of the passengers 624, 626 in FIG. 9*a*). In another embodiment, the key points may be the locations of the left and right shoulders of the passenger (e.g. shoulder locations 621*a-b* of the passenger 620 in FIG. 8*b* and the shoulder locations 625*a-b* and 627*a-b* of the passengers 624, 626 in FIG. 9*a*). The key points are stored in the passenger location data 224 of the memory 204.

If the processor 200 is unable to determine one or both of the key point locations, in one embodiment, then the processor 200 reads the key point location(s) for the previous image from the passenger location data 224. If, however, there are no previous key point data or the key point data has been unavailable for a predetermined number of frames (e.g. approximately 3 frames, approximately 5 frames, or approximately 10 frames) or a predetermined time period (e.g. approximately 0.1 seconds, approximately 0.5 seconds, or approximately 1 second), the processor 200 may determine different key points instead. For example, a system in which the processor is configured to use hip locations as the key points may instead determine the shoulder locations as the key points if the hip locations are unavailable for the predetermined number of frames or time period. The predetermined number of frames or time period may be, for example, stored in the configuration data 228.

In some embodiments, the processor 200 determines the location and boundaries of the passenger using generalized object tracking techniques, rather than human pose estimation techniques. The processor 200 may, for example, use the object tracking techniques to estimate a single center point of the passengers based on the image data 220 in a manner generally known in the art, and store the estimated key points in the passenger location data 224. The processor 200 may also be configured to use object tracking techniques to track non-human objects in the cabin 104 and differentiate the non-human objects from the passengers in the cabin 104, either before or after the determination of the key points.

From the key points, the method 300 continues with determining a single passenger location point for each passenger (block 312). Particularly, the processor 200 converts the multiple key points of each passenger into a single passenger location point for each passenger, and stores the passenger location points in the passenger location data 224 of the memory 204. In one particular embodiment, the passenger location point for each passenger corresponds to the midpoint in the x- and y-direction of the key points.

Figure 9B:
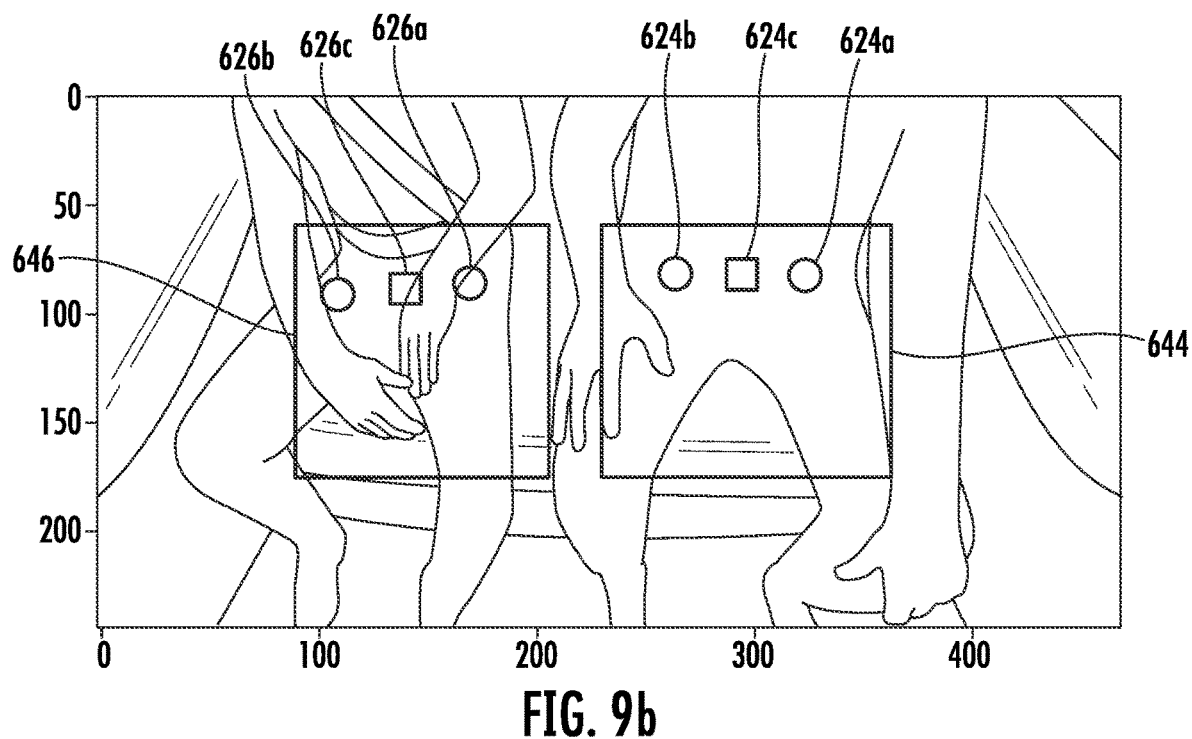
FIG. 9b is an image of portions of two passengers in their respective seats illustrating the passenger hip locations and seat boundaries.

For instance, in the embodiment of FIG. 8*b*, the passenger location point 620*c* is the midpoint between the two hip locations 620*a*, 620*b*. If, alternatively, the shoulder locations are instead used as the key points, the passenger location point 621*c* is the midpoint between the two shoulder locations 621*a*, 621*b*. Likewise, as depicted in FIG. 9*a*, the passenger location points 624*c* and 626*c* correspond to the midpoints of the hip locations 624*a-b* and 626*a-b* of the passengers 624, 626, respectively or, alternatively, the passenger location points 625*c*, 627*c* correspond to the midpoints of the shoulder locations 625*a-b* and 627*a-b* of the passengers 624, 626. As illustrated in FIG. 9*b*, the passenger location points 624*c*, 626*c* may be stored as x-y coordinates within the image. For example, in FIG. 9*b*, the x-y coordinates of the passenger location points 624*c* and 626*c* are, respectively, [290, 80] and [140, 85].

The process 300 continues to determine whether there is a passenger present in the cabin (block 320). Particularly, the processor 200 is configured to detect that there is a passenger present if passenger key points and/or at least one passenger location point is available or, alternatively, if the key points are unavailable but the predetermined number of frames or period of time for which the previous key points can be used has not lapsed from the most recent availability of the key points.

If the processor 200 determines that no passenger is present in block 320 (i.e. no passenger location point data is available), then the passengers have not properly entered the vehicle 100 yet. As such, the method 300 proceeds to block 324 with the processor 200 resetting the seated timer in the seated timer data 236 to its default value, which is retrieved from the configuration data 228. Additionally, because no passengers are detected currently loading into the cabin 104 of the vehicle 100, the processor 200 resets the settling timer to its default value (block 328), which is also retrieved from the configuration data 228, to allow the passengers to perform necessary actions outside the vehicle, for example loading luggage into the vehicle 100, without starting the timer for triggering the abnormal settling event. The method 300 then continues to block 304 with the processor 200 continuing the settling detection loop.

Returning to block 320, if there are passengers detected, the method 300 continues to determine whether the passengers are within seat boundaries (block 332). Particularly, the processor 200 retrieves the passenger location points from the passenger location data 224 and compares the passenger location points with seat boundaries retrieved from the configuration data 228.

In some embodiments, the associated seat boundaries depend on whether the passenger locations are based on the hip points of the passengers or the shoulder points of the passengers. For instance, the seat boundaries for a passengers' shoulders are higher on the seat than the seat boundaries for the passengers' hips to reflect that the safe position for passengers' shoulders are naturally higher than the safe position for passengers' hips. In the example depicted in FIG. 8*b*, the passenger location point 620*c* is inside the seat boundaries 640*a*, 640*b* (for the purposes of the described method 300, only one of the seat boundaries 640*a*, 640*b* is used, though the reader should appreciate that inner and outer seat boundaries may be used in a similar manner as discussed below with reference to the process 500). Likewise, in FIG. 9*b*, both passengers' respective locations 624*c*, 626*c* are within the associated seat boundary 644, 646.

If one or more passengers are not within one of the seat boundaries in block 332, the method 300 continues to reset the seated timer in the seated timer data 236 to its default value (block 336). Particularly, the processor 200 recalls the default value for the seated timer from the configuration data 228 and stores the default value as the seated timer value in the seated timer data 236.

The method 300 continues by decrementing the settling timer in the settling timer data 232 (block 340). Particularly, the processor 200 recalls the settling timer value from the settling timer data 232, decrements it by, for example, one or by the time elapsed, and stores the decremented value as the new settling timer value in the settling timer data 232.

The method 300 then checks whether the settling timer has reached zero (block 344). Particularly, the processor 200 determines if the settling timer is zero. If the settling timer has not yet reached zero, the time allotted for the passengers to settle into the vehicle 100 has not elapsed, and the method 300 therefore continues to block 304 for the processor 200 to repeat the settling detection loop without generating an alert.

If, alternatively, the settling timer is zero in block 344, then the passengers have not properly settled into the vehicle in the time allotted for settling. The processor 200 therefore generates an abnormal settling event alert, which is stored in the abnormal settling event data 240 and/or transmitted to the vehicle ECU 112 as an electronic signal via the communication interface assembly 212 (block 348).

The method 300 then continues by resetting the settling timer data 232 to its default value (block 352), and continuing the passenger settling loop at block 304. More particularly, the processor 200 recalls the default value of the settling timer from the configuration data 228 and stores the default value as the settling timer value in the settling timer data 232. Since the settling timer is reset to the predetermined default value and the passenger settling loop continues, the processor 200 of the passenger settling monitoring system 138 may generate another abnormal settling alert if the passengers are still not settled before the settling timer reaches zero again. As such, the passenger settling monitoring system 138 is configured to generate repeated abnormal settling alerts until all passengers properly settle into the vehicle.

Returning now to block 332, if the passengers' locations are all determined by the processor 200 to be inside allowed seat areas, the method 300 continues by decrementing the seated timer variable (block 356). Particularly, the processor 200 recalls the seated timer variable form the seated timer data 236, decrements it by one or by the time elapsed, and stores the decremented seated timer variable in the seated timer data 236 of the memory 204.

Then, the method 300 determines whether the seated timer variable has reached zero (block 360). More specifically, the processor 200 determines whether the seated timer variable has reached zero. If the seated timer variable is not yet zero, the passengers have not yet been seated for the required length of time. As such, the method 300 proceeds to block 340 by decrementing the settling timer variable, as discussed above.

If, however, the seated timer variable has reached zero in block 360, all passengers have been in their respective seats for the required length of time, and are therefore properly settled. Accordingly, the process 300 terminates. In some embodiments, the process 300 terminates at block 364 by commencing the out-of-seat detection loop discussed below with reference to FIG. 6.

Mitigation of Abnormal Settling Event

Figure 4:
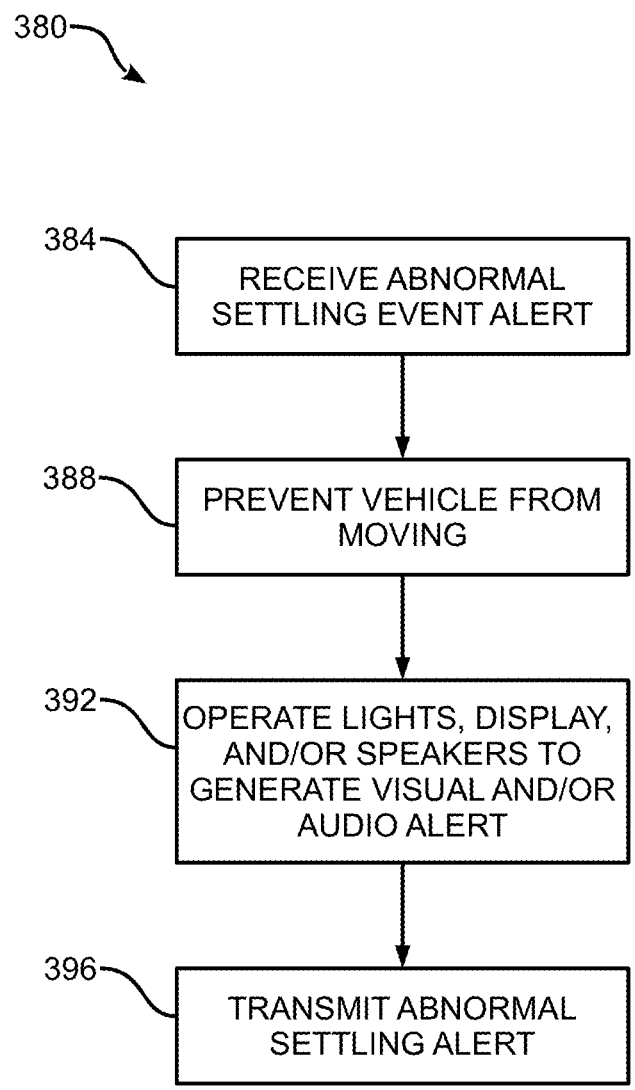
FIG. 4 is a flow diagram of a method of operating the vehicle of FIG. 1 to mitigate a detected abnormal settling event.

FIG. 4 illustrates a method 380 of operating the vehicle 100 to mitigate an unsafe condition or assist the passenger in settling properly in response to detection of an abnormal settling event by operating at least one component of the vehicle 100 in a predefined manner. In the description of the method 380, statements that a method, process, module, processor, system, or the like is performing some task or function refers to a controller or processor (e.g., the vehicle ECU 112) executing programmed instructions stored in non-transitory computer readable storage media operatively connected to the controller or processor to manipulate data or to operate one or more components in the cabin monitoring system 108 and/or the vehicle 100 to perform the task or function. Additionally, the steps of the methods may be performed in any feasible chronological order, regardless of the order shown in the figures or the order in which the steps are described. It will be appreciated that, in some embodiments, the operations of the vehicle ECU 112 described herein may be performed by other components of the processing system 150 and/or of the cabin monitoring system 108, and/or may be performed by a processor of the processing system 150 that is remote from the vehicle 100 (e.g. in the "cloud").

The method 380 begins by receiving an abnormal settling event (block 384). Particularly, the vehicle ECU 112 receives the signal corresponding to the abnormal settling event alert generated by the passenger settling monitoring system 138 via, for example, the communication bus 152.

The method 380 continues by preventing the vehicle from moving (block 388). More specifically, while the abnormal settling event is active, the vehicle ECU 112 prevents the drive system 116 from operating to commence movement of the vehicle. For example, the vehicle ECU 112 prevents the vehicle 100 from moving by activating the brakes and disabling the motor of the drive system 116 until the passengers are properly settled into their respective seats and are in a safe position to be transported by the vehicle 100.

Additionally, the method 380 also includes operating lights, a display, and/or speakers in the vehicle to generate a visual and/or audio alert (block 392). In particular, in response to receiving the abnormal settling event alert, the vehicle ECU 112 operates the lights 180, speakers 184, and/or display 188 to generate a visual and/or audible alert in the cabin 104 of the vehicle 100. For example, the vehicle ECU 112 may operate the speakers 184 to emit an audible alarm tone or a pre-recorded message informing the passenger that one or more passengers in the vehicle 100 is not settled into a seat. Additionally or alternatively, the vehicle ECU 112 may operate the lights 180 to illuminate and/or flash to alert the passengers that the ride cannot be started until all passengers are settled into their seats. In some embodiments, the vehicle ECU 112 operates the display 188 to flash, display a textual warning to the passengers and/or display a video or animation instructing the passengers how to safely sit in the vehicle 100.

In some embodiments, the method 380 proceeds by transmitting an abnormal settling alert (block 396). Particularly, the vehicle ECU 112 may be configured to transmit a signal corresponding to the detected abnormal settling event to a remote server via the transceiver 196. For example, the signal corresponding to the abnormal settling event may be transmitted to a central control server to enable human intervention, for example a remote operator who can resolve the abnormal settling event by taking remote control of the vehicle 100 or communicating with the passengers via the speakers 184 and display 188 to instruct the passengers how to properly load into the vehicle 100.

In one embodiment, the vehicle ECU 112 may be configured to trigger corrective action based on a predefined escalation method. For example, the vehicle ECU 112 may first operate the display 188 in block 388 to play a video of how to sit in the vehicle properly. If the abnormal settling alert persists, the vehicle ECU 112 may be configured to then operate the speakers 184 in block 388 to produce an audible alert warning the passengers that the ride cannot be started until all passengers are properly seated. If the abnormal settling event is still active after the audible alert is generated, the vehicle ECU 112 may communicate the alert to the remote server via the transceiver 196 (block 392) so that a remote operator can intervene and determine why the passengers have not properly settled into the vehicle 100 and instruct the passengers how to load into the vehicle.

The passenger settling monitoring system 138 is therefore configured to detect abnormal passenger settling events in the process 300, and the process 380 mitigates unsafe conditions caused by the abnormal settling event and assists in the passenger properly settling in the vehicle. For example, if a passenger enters the vehicle 100 with an abnormal amount of luggage or items, the passenger may take an abnormal amount of time (i.e. longer than the settling timer default value) to find space for the items and arrange them before being seated. The passenger settling monitoring system 138 is advantageously configured to detect this abnormal settling event, and a video or animation can be displayed on the display 188 to instruct the passenger how to properly load the luggage and settle into the vehicle. If the passengers are still unable to properly settle into the seats, the vehicle ECU 112 audibly alerts the passengers that the ride cannot start, and then, if the passengers are still not settled, communicates with the remote server via the transceiver 196 to enable human intervention.

As another example, the passenger settling monitoring system 138 detects a situation in which a passenger enters slower or in an abnormal pattern due to a passenger's physical disability. The detection of the abnormal settling event by the processing system 150 advantageously enables human intervention to assist the disabled passenger in entering the vehicle by, for example, calling for help at the location of the passenger or operating components in the vehicle to assist, for example by lowering a ramp or lowering the seats of the vehicle for easier access.

The passenger setting detection system can also detect a passenger who enters sideways, moves over another passenger, changes positions frequently, and otherwise exhibits abnormal movements while settling into the vehicle. The detection of the abnormal settling event advantageously enables the processing system 150 to provide automated instructions of proper settling, and enables the processing system 150 to communicate with a remote server to enable human intervention to assist the passenger in properly settling into the vehicle.

In another embodiment, in response to the abnormal settling alert, the vehicle ECU 112 may be configured to analyze the image data to determine whether there is a problem with the seat that prevents the passenger from properly settling into the seat. For example, the vehicle ECU 112 may detect that the seat is damaged or has an object or covering on the seat preventing the passenger from properly using the seat, and operate the speakers 184, display 188, or transceiver 196 based on the detection of the problem with the seat.

In another embodiment, the vehicle ECU 112 may be configured to determine whether there is an emergency situation preventing the passenger from properly settling into his or her seat. For instance, in response to the abnormal settling event alert, the vehicle ECU 112 may analyze the image data to determine whether the passenger is in distress due to, for example, a medical issue or criminal activity, which prevents the passenger from settling into his or her seat.

Out of Seat Detection System

As discussed briefly above, the cabin monitoring system 108 also includes a passenger out-of-seat detection system 140 that operates after the passengers are settled to detect potentially unsafe conditions resulting from the passengers moving out of their respective seats while the vehicle 100 is in motion. Referring now to FIG. 5, the out-of-seat detection system 140 of the cabin monitoring system 108 is configured to monitor the cabin 104 of the vehicle and determine whether a user is out of his or her respective seat based on the received sensor signals, generate a signal representative of an out-of-seat determination, and communicate the signal to the vehicle ECU 112. The out-of-seat detection system 140 is communicatively coupled to the image sensors 142, 144 via communication buses 152, and is configured to receive sensor signals, which may be analog or digital signals, from each of the image sensors 142, 144.

The out-of-seat detection system 140 comprises at least one processor and/or controller 400, referred to below simply as the processor 400, operably connected to an associated memory 404. The processor 400 of the out-of-seat detection system 140 is configured to execute program instructions 408 stored on the associated memory 404 thereof to manipulate data (e.g. data 420-444) or to operate one or more components in the out-of-seat detection system 140 or of the vehicle 100 to perform the recited task or function.

The memory 404 is an electronic storage device that is configured to store data and program instructions, including at least image data 420, passenger location data 424, configuration data 428, alert latency data 432, reset counter data 436, internal state data 440, out-of-seat event data 444, and the program instructions 408 for operating the out-of-seat detection system 140. The memory 404 may include non-transitory computer-readable storage media and/or communication media, such as both volatile and nonvolatile, both write-capable and read-only, both removable and non-removable media implemented in any media or technology, including CD-ROM, DVD, optical disk storage, magnetic cassettes, magnetic tape, magnetic disk storage, or other known storage media technology.

As noted above, in some embodiments, the out-of-seat detection system 140 may be integrated with either or both of the vehicle ECU 112 and the passenger settling detection system 138. For example, the processor 400 and memory 404 may be the same processor 200 and memory 204 discussed above with regard to the passenger settling monitoring system 138, and/or the processor 400 and memory 404 may be the same processor and memory as in the vehicle ECU 112.

The image data 420 is electronic data representative of the image or images captured by the image sensors 142, 144. The passenger location data 424, as discussed in detail below, represents one or more points representative of a position of the passenger and/or relevant body parts of the passenger. The points may be stored as, for example, x-y coordinates corresponding to pixel locations in the associated image.

The configuration data 428 includes the boundaries of the seats from the image sensor views which may, in one embodiment, also be x-y coordinates corresponding to pixel locations in the associated image. The configuration data 428 may include, for example, an inner boundary and an outer boundary for passenger hips and/or shoulders for each of the seats 120-126. The boundaries may be rectangular, trapezoidal, circular, triangular, another polygon, a combination of the above shapes, or any other suitable shape. Alternatively, the seat boundaries may be irregularly shaped so as to follow a desired contour of the seat region. In addition, the configuration data 428 includes predetermined default values for the internal state variable, the reset counter variable, and the alert counter variable. The configuration data 428 may be pre-programmed into the memory 404, or it may be user-configurable or remotely configurable depending on the desired use or configuration of the vehicle 100.

The alert latency data 432 includes the alert latency variable, which corresponds to a decrementing timer of the number of frames or length of time that a passenger must be out of his or her respective seat boundary before the alert is generated. The reset counter data 436 includes the reset timer variable, which corresponds to a decrementing counter of the number of frames or length of time that the passengers must be back in their respective seat boundaries after an alert has been generated before the alert state is reset and another out-of-seat event alert can be generated again.

The internal state data 440 includes the internal state variable, which corresponds to an indication of whether a passenger out-of-seat event has been previously generated without the alert state having been reset. The out-of-seat event data 444 is the alert data that is output by the out-of-seat detection system 140 when a passenger out-of-seat event has been detected so as to enable the vehicle ECU 112 to implement actions to mitigate potentially unsafe conditions arising from the passenger being outside of his or her respective seat.

In some embodiments, the out-of-seat detection system 140 further comprises a communication interface assembly 412 having one or more interfaces configured to couple the out-of-seat detection system 140 with the image sensors 142, 144 and the vehicle ECU 112. The communication interface assembly 412 is configured to enable sensor data, control signals, software, or other information to be transferred between the out-of-seat detection system 140 and the image sensors 142, 144 or the vehicle ECU 112 in the form of signals which may be, for example, electronic, electromagnetic, optical, or other signals capable of being received or transmitted by the communication interface assembly 412. In some embodiments, the communication interface assembly 412 may include physical terminals for connecting to wired media such as a wired network or direct-wired communication (e.g., the communication buses 152). In further embodiments, the communication interface assembly 412 may include one or more modems, bus controllers, or the like configured to enable communications with the image sensors 142, 144 and the vehicle ECU 112. In some embodiments, the communication interface assembly 412 may include one or more wireless transceivers configured to enable wireless communication such as acoustic, RF, infrared (IR), Wi-Fi, Bluetooth®, and other wireless communication methods.

Out of Seat Detection Process

Figure 6:
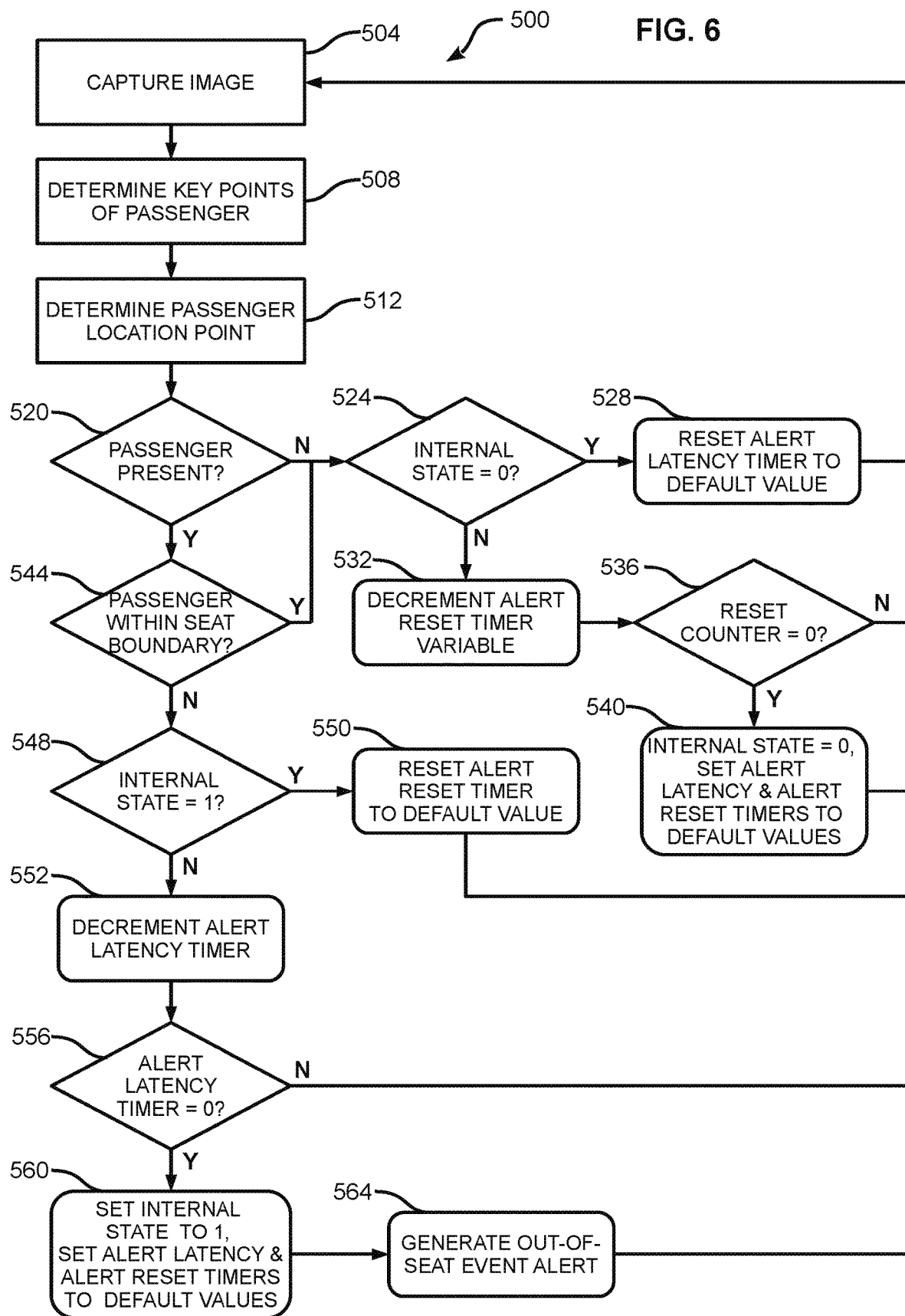
FIG. 6 is a flow diagram of a method of operating the passenger out-of-seat detection system of FIG. 1 to generate an alert if a passenger is out of his or her respective seat.

In operation, the out-of-seat detection system 140 is configured to implement a method 500 illustrated by the flowchart of FIG. 6 to determine whether one or more passengers are out of their respective seats 120-126. In the description of the method 500, statements that a method, process, module, processor, system, or the like is performing some task or function refers to a controller or processor (e.g., the processor 400) executing programmed instructions (e.g., the program instructions 408) stored in non-transitory computer readable storage media (e.g., the memory 404) operatively connected to the controller or processor to manipulate data or to operate one or more components in the cabin monitoring system 108 and/or the vehicle 100 to perform the task or function. Additionally, the steps of the methods may be performed in any feasible chronological order, regardless of the order shown in the figures or the order in which the steps are described. It will be appreciated that, in some embodiments, the operations of the processor 400 described herein may be performed by other components of the processing system 150 and/or of the cabin monitoring system 108, such as the vehicle ECU 112 or integrated image processors of the sensors 142, 144, etc., or the operations may be performed by one or more processors that are remote from the vehicle (e.g. in the "cloud").

The method 500 of FIG. 6 begins with the image sensors 142, 144 capturing images of the seats 120-126 (block 504). The images may be RGB images of the seats 120-126, or the images may be infrared images, three-dimensional radar or LIDAR images, or other desired images. The image sensors 142, 144 transmit the images to the processor 400 of the out-of-seat detection system 140 via, for example, the communication interface assembly 412. The images may, in some embodiments, be resized by either the image sensors 142, 144 or the processor 400, and stored in the memory 404 as the image data 420. Example images 600, 610 are depicted in FIGS. 8a and 9a, of which FIG. 8a depicts an example image 600 captured by the rear image sensor 144 illustrating a passenger 620 sitting in the seat 124, while FIG. 9a illustrates an example image 610 captured by the rear image sensor 144 illustrating two passengers 624, 626 sitting in the rear seats 124, 126.

Referring back to FIG. 6, the method 500 continues by processing the image data to determine key points of the passengers in the cabin 104 (block 508). Particularly, the processor 400 is configured to determine a plurality of key points in the image data to estimate a pose of the passenger. More particularly, the processor 400 processes the image data to approximate the positions of certain joints of the passenger based on the image data 420, and returns the positions as x-y coordinates in the image. The processor 400 may be configured to execute any suitable pose estimation technique in a manner generally known in the art.

The key points are, in one embodiment, the locations of the left and right hips of the passengers (e.g. hip locations 620a and 620b of the passenger 620 in FIG. 8b and hip locations 624a-b and 626a-b of the passengers 624, 626 in FIG. 9a). In another embodiment, the key points may be the locations of the left and right shoulders of the passengers (e.g. shoulder locations 621a-b of the passenger 620 in FIG.

8b and the shoulder locations 625a-b and 627a-b of the passengers 624, 626 in FIG. 9a). The key points are stored in the passenger location data 424 of the memory 404.

If the processor 400 is unable to determine one or both of the key point locations, in one embodiment, the processor reads the key point location(s) for the previous image from the passenger location data 424 and uses the previous key point locations again. If, however, there are no previous key point data or the key point data has been unavailable for a predetermined number of frames (e.g. approximately 3 frames, approximately 5 frames, approximately 10 frames, or approximately 20 frames) or a predetermined time period (e.g. approximately 1 second, approximately 2 seconds, approximately 3 seconds, or approximately 5 seconds), the processor 400 may determine different key points instead. For example, a system in which the processor is configured to use hip locations as the key points may instead determine the shoulder locations as the key points if the hip locations are unavailable for the predetermined number of frames or time period. The predetermined number of frames or time period may be, for example, stored in the configuration data 428.

In some embodiments, the processor 400 determines the location and boundaries of the passenger using generalized object tracking techniques, rather than human pose estimation techniques. The processor 400 may, for example, use the object tracking techniques to estimate a single center point of the passengers based on the image data 420 in a manner generally known in the art, and store the estimated key points in the passenger location data 424. The processor 400 may also be configured to use object tracking techniques to track non-human objects in the cabin 104 and differentiate the non-human objects from the passengers in the cabin 104, either before or after the determination of the key points.

From the key points, the method 500 continues by determining a single passenger location point for each passenger (block 512). Particularly, the processor 400 converts the multiple key points of each passenger into a single passenger location point for each passenger, and stores the passenger location points in the passenger location data 424 of the memory 404. In one particular embodiment, the passenger location point for each passenger corresponds to the midpoint in the x- and y-direction of the key points.

For instance, in the embodiment of FIG. 8b, the passenger location point 620c is the midpoint between the two hip locations 620a, 620b. Alternatively, if the shoulder points are instead used as the key points, the passenger location point 621c is the midpoint between the two shoulder locations 621a, 621b. Likewise, as depicted in FIG. 9a, the passenger location points 624c and 626c correspond to the midpoints of the hip locations 624a-b and 626a-b of the passengers 624, 626, respectively or, alternatively, the passenger location points 625c, 627c correspond to the midpoints of the shoulder locations 625a-b and 627a-b of the passengers 624, 626. As illustrated in FIG. 9b, the passenger location points 624c, 626c may be stored as x-y coordinates within the image. For example, in FIG. 9b, the x-y coordinates of the passenger location points 624c and 626c are, respectively, [290, 80] and [140, 85] based on the coordinate system of the image depicted in FIG. 9b.

The process 500 continues by determining whether there is a passenger present in the cabin (block 520). Particularly, the processor 400 is configured to detect that there is a passenger present if passenger key points and/or at least one passenger location point is available or, alternatively, if the key points are unavailable but the predetermined number of frames or period of time for which the previous key points can be used has not lapsed from the most recent availability of the key points.

If the processor 400 determines that no passenger is present in block 520 (i.e. no passenger location point data is available), the process 500 proceeds to check whether the internal state variable is zero (block 524). Specifically, the processor 400 recalls the internal state variable from the internal state data 440 in the memory 404 and determines whether the variable is zero or not zero (i.e. one). As noted above, the internal state variable indicates whether a previous out-of-seat event alert has been generated and not reset. For example, if the internal state variable is zero, no alert has been generated or the previous alert has been reset. If the internal state variable is one, an alert has previously been generated and has not been reset.

If the internal state variable at block 524 is zero (i.e. no previous alert or the previous alert has been reset) with no passenger present, there are no passengers detected and no passenger out-of-seat event is active. As a result, there is no potentially unsafe condition detected by the out-of-seat detection system 400. As a result, the method 500 proceeds to reset the alert latency variable to its default value (block 528). More particularly, the processor 400 recalls the default value of the alert latency variable from the configuration data 428 and stores the default value as the alert latency variable in the alert latency data 432. The method 500 then continues at block 504.

If, alternatively, the internal state variable is not zero (i.e. an out-of-seat event has been previously activated and not reset) in block 524, there is no passenger present, but there is an active out-of-seat even that has not been reset. As a result, the method 500 continues by decrementing the alert reset timer (block 532). More particularly, the processor 400 recalls the default value for the alert reset timer from the configuration data 428 and stores the default value as the alert reset variable in the reset timer data 436 of the memory 404.

The method 500 then continues by checking whether the alert reset counter is zero (block 536). In particular, the processor 400 recalls the alert reset variable from the reset timer data 436 and determines whether the reset timer has reached zero.

If, after decrementing the alert reset timer, the alert reset timer is zero (block 536), sufficient time has elapsed since the out-of-seat event was detected and another alert can now be generated if there is another unsafe condition. The process 500 therefore proceeds by setting the internal state variable in the internal state data 440 to zero and resetting the alert latency and alert reset timer variables in the respective alert latency data 432 and alert reset data 436 to their respective default values (block 540). In particular, the processor 400 sets the internal state variable in the internal state data 440 to zero, recalls the default values of the alert latency and reset timers from the configuration data 428, and stores the respective default values as the alert latency and reset timer variables, respectively, in the alert latency data 432 and reset timer data 436. The method 500 then returns to block 504.

Alternatively, if the reset counter variable is not zero in block 536 after being decremented, sufficient time has not elapsed since the out-of-seat event was detected. The process 500 therefore returns to block 504 with the decremented reset timer variable updated in the alert reset timer data 436.

Returning now to block 520, if the processor 400 determines that at least one passenger is present, the method 500 continues by determining whether the passengers are within the seat boundaries (block 544). The processor 400 retrieves the passenger location points from the passenger location data 424 and the associated seat boundaries from the configuration data 428, and compares the passenger location points with the associated seat boundaries to determine whether the passenger location points are inside the seat boundaries.

In some embodiments, the associated seat boundary depends on whether the passenger locations are based on the hip locations of the passengers or the shoulder locations of the passengers, and whether the internal state is zero or one (i.e. whether an out-of-seat event has been activated and not reset). For instance, the seat boundary for a passenger's shoulder midpoint is higher on the seat than the seat boundary for the passenger's hip midpoint to reflect that a passenger's shoulders are naturally located higher on the seat than the passenger's hips.

In addition, when the internal state is zero, a larger seat boundary, referred to as the outer seat boundary (e.g. 640*a* in FIG. 8*b*) is used by the processor 400 to determine whether to generate an alert for a passenger being out of the seat and causing a potentially unsafe condition. Alternatively, when the internal state is one, a smaller seat boundary, referred to as the inner seat boundary (e.g. 640*b* in FIG. 8*b*), is used by the processor 400 to determine whether to reset the internal state because the passenger has returned to his or her seat and has therefore remedied the potentially unsafe condition. Since a smaller area is used to reset the internal state than is used to activate the alert, the processor 400 will not generate repeated out-of-seat event alerts in a situation in which the passenger location is moving slightly across either seat boundary. In other words, since the passenger must be outside the outer seat boundary 640*a* for the processor 400 to trigger the out-of-seat event alert, and back within the inner seat boundary 640*b* for the processor 400 to reset the alert, repeated movement across the outer seat boundary 640*a* alone will result in the processor 400 only triggering a single alert, while the processor 400 will not generate an alert due to repeated movement across the inner seat boundary 640*b*.

If the passenger location is determined by the processor 400 to be inside the allowed area in block 544, the process continues to block 524 in a similar manner as discussed above if no passenger is present. For example, FIG. 8*b* depicts a passenger 620 whose passenger location point 620*c* is inside both the inner and outer boundaries 640*b*, 640*a*. Likewise, FIG. 9*b* depicts passengers 624, 626 whose respective locations 624*c*, 626*c* are within the associated seat boundary 644, 646.

Since the passengers are determined by the processor 400 to be within their respective seat boundaries, if the internal state is determined by the processor 400 to be zero in block 524 (i.e. no out-of-seat alert has been sent since the last reset), the processor 400 proceeds to reset the alert latency data 432 to its default value (block 528), as described above, because no potentially unsafe condition is presently detected by the processor 400. If, alternatively, the internal state is determined by the processor 400 to be one in block 524 (i.e. the passenger has returned to his or her seat after an out-of-seat event that has not yet been reset), the processor 400 decrements the reset timer data 436 (block 532) as described above and, if the alert reset variable is determined by the processor 400 to be zero (block 536), the processor 400 resets all of the variables to their (block 540) predetermined default values so that another out-of-seat event can be generated if an unsafe condition occurs. The process 500 then returns to block 504.

Returning to block 544, if one or more passenger locations are determined by the processor 400 to be outside the associated seat boundary (as illustrated for example in FIGS. 10*a* and 10*b*), the method 500 continues by checking whether the internal state variable is one (block 548). More particularly, the processor 400 recalls the internal state variable of the internal state data 440 from the memory and determines whether the internal state variable is one.

If the internal state is one, then the passenger is still located outside the seat boundary after an out-of-seat alert has been previously generated. As such, the method 500 continues by resetting the alert reset timer to its default value so that the out-of-seat alert cannot be generated until the passenger returns to his or her seat for the predefined number of frames or period of time (block 550). In particular, the processor 400 recalls the predetermined default value of the alert reset timer from the configuration data 428 and stores the default value as the reset timer variable in the reset timer data 436 of the memory 404. The process 500 then continues at block 504.

If the internal state is determined by the processor 400 to be zero in block 548, then the passenger is out of his or her respective seat, but no out-of-seat event is presently active. The method 500 continues by decrementing the alert latency timer (block 552). Specifically, the processor 400 recalls the alert latency variable from the alert latency data 432, decrements it by one frame or by the elapsed time, and stores the decremented alert latency variable in the alert latency data 432.

The method 500 continues by checking whether the alert latency timer is zero (block 556). More specifically, the processor 400 determines whether the alert latency timer is zero. If the decremented alert latency is not yet zero in block 556, then the latency time period has not expired. The processor 400 does not therefore generate the out-of-seat event alert, allowing the passenger time to return to his or her seat before the alert is generated. In addition, the alert latency time reduces the incidence of false positives (i.e. an alert is generated when the passenger is not out of his or her respective seat) that could be caused by faulty image analysis, an obstructed view, etc., since the passenger must be detected out of his or her respective seat for multiple frames for the alert to be generated. In one embodiment, the default alert latency timer value may be between two and five seconds. In another embodiment, the default alert latency timer value may be approximately 3.5 seconds. After the processor 400 determines that the alert latency timer is not yet zero in block 556, the method 500 continues at block 504.

If, however, the alert latency is determined by the processor 400 to be zero in block 556, the internal state variable in the internal state data 440 is set to one and the alert latency and alert reset timers are set to their default values (block 560). In particular, the processor 400 sets the internal state variable in the internal state data 440 to one, recalls the default values of the alert latency and reset timers from the configuration data 428, and stores the respective default values as the alert latency and reset timer variables, respectively, in the alert latency data 432 and reset timer data 436.

The process 500 also generates the out-of-seat event alert (block 564). The processor 400 stores data corresponding to the out-of-seat event alert in the out-of-seat event data 444 in the memory 404 and/or generates an electronic signal that is transmitted via the communication interface assembly 412 and the communication bus 152 to the vehicle ECU 112. The method 500 then continues the out-of-seat detection loop at block 504.

Figure 10A:
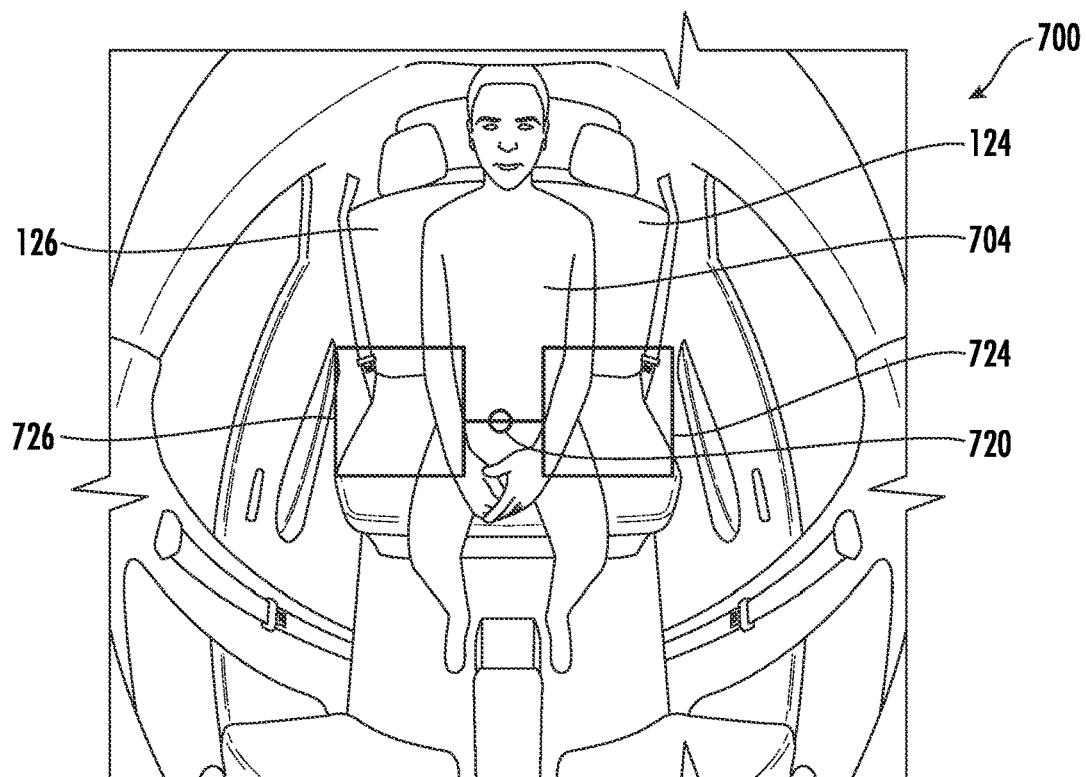
FIG. 10a is an image of a passenger sitting between seat boundaries.

FIG. 10a illustrates an image 700 of a passenger 704 who has moved between two seats 124, 126 of the vehicle 100. Because the midpoint 720 of the passenger's hip locations is located outside of both seat areas 724, 726 (the seat areas illustrated in FIG. 10a correspond to the outer seat areas described above), the processor 400 of the out-of-seat detection system 140 implementing the process 500 will generate an out-of-seat event alert if the passenger 704 does not return to one of the seat areas 724, 726 before the alert latency timer expires.

Figure 10B:
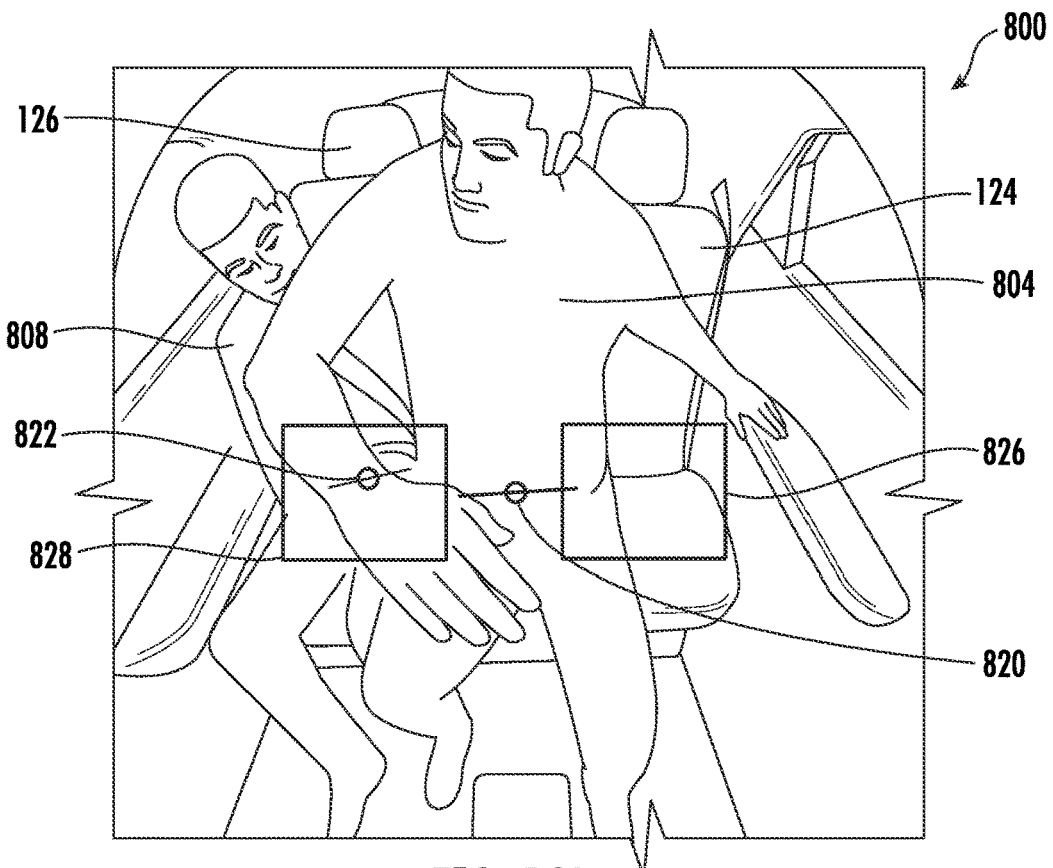
FIG. 10b is an image of two passengers, one of whom is within the seat boundary and the other of whom is outside of the seat boundary.

FIG. 10b illustrates an image 800 of two passengers 804, 808, one of whom has moved between the seats 124, 126 of the vehicle 100. Because the midpoint 820 of the passenger's hips has moved outside of the seat area 826, the processor 400 of the out-of-seat detection system 140 will generate an out-of-seat event alert for the passenger 804 if the passenger 804 does not return to the seat area 826 before the alert latency timer expires. The passenger 808, on the other hand, is seated such that the midpoint 822 of the passenger's hips is located within the seat area 828. As such, the processor 400 of the out-of-seat detection system 140 does not generate an out-of-seat event alert for the passenger 808.

In the description above, the method 500 is performed by the processor 400 concurrently for all of the seats 120-126 and passengers in the cabin 104. In other embodiments, the method 500 may be performed separately by the processor 400 for each individual seat, or for each individual passenger. For example, if a passenger is detected by the processor 400 as having moving out of the left-front seat 120 in block 544, and is detected by the processor 400 in a subsequent loop in the right-front seat 122 in block 544 before the processor 400 decrements the alert latency counter to zero (blocks 552-556), the processor 400 does not generate the out-of-seat event alert (block 564) because the passenger determined to be in a seat and no unsafe condition exists.

While the illustrated embodiment includes an out-of-seat detection system 140 implemented in a separate logic unit from the vehicle ECU 112, the reader should appreciate that, in some embodiments, the out-of-seat detection system 140 may be implemented in the vehicle ECU 112. For instance, the vehicle ECU 112 may include the processor 400 and the memory 404 as separate components within the vehicle ECU 112, or the functions of the processor 400 may be performed by the processor and/or controllers of the vehicle ECU 112, and the data 420-444 and instructions 408 may be stored in the memory associated with the vehicle ECU 112.

Mitigation of Out-of-Seat Unsafe Conditions

Figure 7:
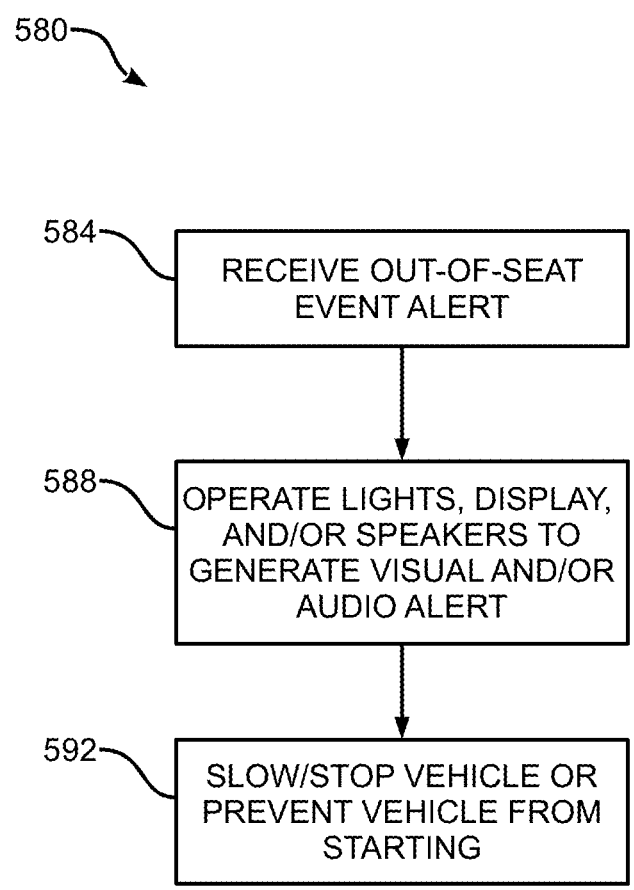
FIG. 7 is a flow diagram of a method of operating the vehicle of FIG. 1 to mitigate a detected passenger out-of-seat event.

FIG. 7 illustrates a method 580 of operating the vehicle 100 to mitigate the unsafe condition caused by the passenger being out of his or her respective seat by operating at least one component of the vehicle to in a predefined manner in response to detecting that at least one passenger is located outside of his or her seat. In the description of the method 580, statements that a method, process, module, processor, system, or the like is performing some task or function refers to a controller or processor (e.g., the vehicle ECU 112) executing programmed instructions stored in non-transitory computer readable storage media operatively connected to the controller or processor to manipulate data or to operate one or more components in the cabin monitoring system 108 and/or the vehicle 100 to perform the task or function. Additionally, the steps of the methods may be performed in any feasible chronological order, regardless of the order shown in the figures or the order in which the steps are described. It will be appreciated that, in some embodiments, the operations of the vehicle ECU 112 described herein may be performed by other components of the processing system 150 and/or of the cabin monitoring system 108, and/or may be performed by a processor of the processing system 150 that is remote from the vehicle 100 (e.g. in the "cloud").

The process 580 begins with receipt of an out-of-seat event alert (block 584). In particular, the vehicle ECU 112 receives the electronic signal corresponding to the out-of-seat event alert generated by the out-of-seat detection system 140 via, for example, the communication bus 152 (block 584).

The method 580 proceeds with the vehicle ECU 112 operating the lights 180, speakers 184, and/or display 188 to generate a visual and/or audio alert in the cabin 104 of the vehicle 100 (block 588). The vehicle ECU 112 may, for example, operate the speakers 184 to emit an alarm tone or a pre-recorded message informing the passenger that one or more passengers in the vehicle 100 has been detected out of his or her respective seat, thereby alerting the passengers to the potentially unsafe condition. Additionally or alternatively, the vehicle ECU 112 may operate the lights 180 to illuminate and/or flash to alert the passengers to the potentially unsafe condition. In some embodiments, the vehicle ECU 112 operates the display 188 to flash, display a textual warning to the passengers, and/or display a video or animation instructing the user of the potentially unsafe condition and how to safely sit in the vehicle 100.

The method 580 also includes slowing and/or stopping the vehicle or preventing the vehicle from starting (block 592). In particular, the vehicle ECU 112 operates the drive system 116 to slow or stop the vehicle or, depending on the current drive state of the vehicle 100, prevent the vehicle from commencing movement. For example, if the vehicle 100 is traveling on a road, the vehicle ECU 112 may operate the motor and brakes of the drive system 116 to reduce the speed vehicle 100, identify a safe location to stop the vehicle 100, and operate the steering to steer the vehicle 100 to the identified location at which it is safe to stop the vehicle 100. Once the vehicle 100 is stopped, or if the vehicle 100 was already stopped when the out-of-seat event alert was received in block 584, the vehicle ECU 112 prevents the vehicle 100 from moving by activating the brakes and disabling the motor until the passengers return to their respective seats and the unsafe condition has been remedied.

In some embodiments, the vehicle ECU 112 may be configured to delay for a predetermined time period after operating the lights, display, and/or speakers in block 588 before slowing or stopping the vehicle in block 592 to allow the passenger time to return to his or her seat and thereby remedy the unsafe condition. The predetermined time period may be, for example, between approximately 5 seconds and approximately 15 seconds.

In some embodiments, the vehicle ECU 112 may be configured to transmit an electronic signal corresponding to the detected out-of-seat event to a remote server via the transceiver 196. For example, the vehicle ECU 112 may transmit the out-of-seat event signal to a central control server to enable human intervention, for example a remote operator mitigating the unsafe condition by taking remote control of the vehicle or warning the passengers via the speakers 184 and/or display 188, to remedy the potentially unsafe condition. In another embodiment, the transmitted signal may be stored by the remote server in connection with the passenger's user account to identify the passenger as causing a potentially unsafe condition. The stored information may be used by the remote server to charge a fine to the passenger's account and/or suspend or deactivate the passenger's account.

In another embodiment, in response to the detected out-of-seat event, the vehicle ECU 112 may be configured to analyze the image data to determine whether there is a problem with the seat that has caused the passenger to move from his or her seat. For example, the vehicle ECU 112 may detect that the seat is damaged or has an object or covering on the seat preventing the passenger from properly using the seat, and operate the speakers 184, display 188, or transceiver 196 based on the detection of the problem with the seat.

In another embodiment, the vehicle ECU 112 may be configured to determine whether there is an emergency situation in the cabin 104 of the vehicle 100 that has caused the passenger to move out of the seat. For instance, in response to the detected out-of-seat event, the vehicle ECU 112 may analyze the image data to determine whether the passenger is in distress due to, for example, a medical issue or criminal activity, which has caused the passenger to move out of his or her seat.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A system for detecting and mitigating an unsafe condition in a vehicle, comprising:
an image sensor configured to generate and output image data of one or more seats in a cabin of the vehicle; and
a processing system operably connected to the image sensor and including at least one processor, the processing system configured to:
receive the image data from the image sensor;
process the image data to determine a location of at least one passenger in the cabin, the processing of the image data including estimating a pose of the at least one passenger to determine a respective passenger location point for each passenger of the at least one passenger;
detect that the at least one passenger is located outside of the one or more seats based on at least one of the respective passenger location points being outside of a first seat boundary of the at least one seat for a predetermined first time period; and
operate at least one component of the vehicle in a predefined manner in response to detecting that the at least one passenger is located outside of the one or more seats.

2. The system of claim 1, wherein the processing system is further configured to, in the estimation of the pose, estimate hip locations of each passenger, and determine the respective passenger location point as a midpoint between the estimated hip locations.

3. The system of claim 1, wherein the processing system is further configured to, in the estimation of the pose, estimate shoulder locations of each passenger, and determine the respective passenger location point as a midpoint between the estimated shoulder locations.

4. The system of claim 1, wherein the at least one component includes a drive system of the vehicle, and the operating of the at least one component of the vehicle in the predefined manner further comprises:
operating the drive system of the vehicle to slow or stop the vehicle.

5. The system of claim 1, wherein the at least one component includes a speaker configured to project audio into the cabin of the vehicle, and the operating of the at least one component of the vehicle in the predefined manner further comprises:
operating the speaker to generate an audible alert.

6. The system of claim 1, wherein the at least one component includes at least one of a display and a light arranged in or adjacent to the cabin of the vehicle, and the operating of the at least one component of the vehicle in the predefined manner further comprises:
operating the at least one of the display and the light to generate a visual alert.

7. A method for detecting and mitigating an unsafe condition in a vehicle, comprising:
receiving, with a processing system, image data of one or more seats in a cabin of the vehicle from an image sensor;
processing, with the processing system, the image data to determine a location of at least one passenger in the cabin, the processing of the image data including estimating a pose of the passenger with the processing system to determine a passenger location point for each passenger of the at least one passenger;
detecting, with the processing system, that the at least one passenger is located outside of the one or more seats in response to detecting that at least one of the passenger location points is outside of a first seat boundary for a predetermined first time period; and
operating at least one component of the vehicle with the processing system in a predefined manner in response to detecting that the at least one passenger is located outside of the one or more seats.

8. The method of claim 7, wherein the processing of the image data further comprises estimating hip locations of each passenger with the processing system and determining the passenger location point as a midpoint between the estimated hip locations.

9. The method of claim 7, wherein the processing of the image data further comprises estimating shoulder locations of each passenger with the processing system and determining the passenger location point as a midpoint between the estimated shoulder locations.

10. The method of claim 7, wherein the operating of at least one component of the vehicle in the predefined manner comprises operating a drive system of the vehicle with the processing system to slow or stop the vehicle.

11. The method of claim 7, wherein the operating of at least one component of the vehicle in the predefined manner comprises operating a speaker with the processing system to generate an audible alert in the cabin.

12. The method of claim 7, wherein the operating of at least one component of the vehicle in the predefined manner comprises operating at least one of a display and a light with the processing system to generate a visual alert in the cabin.

* * * * *